(12) United States Patent
Ohno

(10) Patent No.: US 11,059,450 B2
(45) Date of Patent: Jul. 13, 2021

(54) VEHICLE OCCUPANT RESTRAINT DEVICE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 26 days.

(21) Appl. No.: 16/238,156

(22) Filed: Jan. 2, 2019

(65) Prior Publication Data
US 2019/0241152 A1 Aug. 8, 2019

(30) Foreign Application Priority Data
Feb. 5, 2018 (JP) .............................. JP2018-018545

(51) Int. Cl.
*B60R 22/20* (2006.01)
*B60R 22/26* (2006.01)
*B60N 2/22* (2006.01)

(52) U.S. Cl.
CPC .............. *B60R 22/20* (2013.01); *B60R 22/26* (2013.01); *B60N 2/22* (2013.01); *B60R 2022/263* (2013.01)

(58) Field of Classification Search
CPC ... B60R 22/20; B60R 22/26; B60R 2022/263; B60R 22/48; B60R 1/00; B60R 2022/208; B60N 2/22
See application file for complete search history.

(56) References Cited

U.S. PATENT DOCUMENTS 3,471,197 A * 10/1969 Ely ..................... B60N 2/879
111/101
4,629,214 A * 12/1986 Fohl ..................... B60R 22/03
280/808

(Continued)

FOREIGN PATENT DOCUMENTS

CN 1130579 A 9/1996
CN 106064603 A 11/2016

(Continued)

OTHER PUBLICATIONS

Mar. 30, 2021 Office Action issued in U.S. Appl. No. 16/552,231.
U.S. Appl. No. 16/552,231 filed Aug. 27, 20219 in the name of Ohno.

*Primary Examiner* — Paul N Dickson
*Assistant Examiner* — Timothy Wilhelm
(74) *Attorney, Agent, or Firm* — Oliff PLC

(57) ABSTRACT

A vehicle occupant restraint device includes a three-point seatbelt device, a shoulder belt anchor, and a mover device. The three-point seatbelt device includes a shoulder belt extending from an upper portion on one seat width direction end side of a seatback configuring a vehicle seat on which an occupant sits, toward a buckle at a lower portion on another seat width direction end side. The shoulder belt anchor is provided for the shoulder belt to pass through at a shoulder opening on the one seat width direction end side of an upper section of the seatback. The mover device moves the shoulder belt anchor toward a top-to-bottom direction lower side of the seatback when the seatback, which is configured to tilt rearward from an upright state, has been tilted rearward by at least a predetermined angle or greater with respect to a vertical direction.

5 Claims, 18 Drawing Sheets

(56) References Cited

U.S. PATENT DOCUMENTS

| | | | | |
|---|---|---|---|---|
| 4,738,485 | A * | 4/1988 | Rumpf | B60N 2/4221 280/806 |
| 5,306,073 | A * | 4/1994 | Rees | B60N 2/233 297/216.1 |
| 5,330,228 | A * | 7/1994 | Krebs | B60N 2/879 280/801.2 |
| 5,358,310 | A * | 10/1994 | Nemoto | B60R 22/023 297/473 |
| 5,390,982 | A * | 2/1995 | Johnson | B60R 22/20 297/410 |
| 5,441,332 | A | 8/1995 | Verellen | |
| 5,544,917 | A * | 8/1996 | Loxton | B60R 22/26 280/801.2 |
| 5,611,604 | A * | 3/1997 | Thomas | B60R 22/26 297/478 |
| 5,628,529 | A | 5/1997 | Golz et al. | |
| 5,660,444 | A * | 8/1997 | Thomas | B60R 22/26 297/354.12 |
| 5,810,417 | A * | 9/1998 | Jesadanont | B60N 2/4221 296/68.1 |
| 5,845,967 | A * | 12/1998 | Kane | B60N 2/2806 297/250.1 |
| 5,882,084 | A * | 3/1999 | Verellen | B60R 22/40 242/384.4 |
| 5,941,604 | A * | 8/1999 | Futschik | B60N 2/366 297/473 |
| 6,068,340 | A * | 5/2000 | Yano | B60R 22/405 242/384.4 |
| 6,145,881 | A | 11/2000 | Miller, III et al. | |
| 6,254,191 | B1 * | 7/2001 | Yamamoto | B60R 22/405 242/384.4 |
| 6,340,209 | B1 * | 1/2002 | Yamamoto | B60R 22/26 297/478 |
| 6,669,302 | B2 * | 12/2003 | Warner, Jr. | B60N 2/2803 297/250.1 |
| 6,802,537 | B1 * | 10/2004 | Tolfsen | B60N 2/508 280/727 |
| 6,811,186 | B1 * | 11/2004 | Fraley | B60N 2/688 280/801.2 |
| 7,090,251 | B2 * | 8/2006 | Tame | B60N 2/206 280/808 |
| 7,637,536 | B2 * | 12/2009 | Delventhal | B65H 75/48 242/383.2 |
| 7,735,934 | B2 * | 6/2010 | Fuhrken | B60R 22/20 280/808 |
| 7,740,096 | B2 * | 6/2010 | Bothe | B60N 2/0252 180/268 |
| 7,866,696 | B2 * | 1/2011 | Wang | B60N 2/0276 280/748 |
| 7,980,635 | B2 * | 7/2011 | Matsushita | B60R 22/03 280/801.1 |
| 8,479,863 | B2 | 7/2013 | Adolfsson et al. | |
| 8,820,789 | B2 * | 9/2014 | Merrill | B60N 2/24 280/806 |
| 9,079,563 | B2 * | 7/2015 | Ito | B60R 22/40 |
| 9,090,228 | B2 * | 7/2015 | Ono | B60R 22/40 |
| 9,174,607 | B2 * | 11/2015 | Hata | B60R 22/40 |
| 9,302,645 | B1 | 4/2016 | Shenaq et al. | |
| 9,434,349 | B1 * | 9/2016 | Perkins | B60N 2/002 |
| 9,669,796 | B2 * | 6/2017 | Ohno | B60R 22/06 |
| 10,144,387 | B1 | 12/2018 | Jaradi et al. | |
| 10,196,033 | B2 | 2/2019 | Loew et al. | |
| 10,246,051 | B2 * | 4/2019 | Tegen | B60R 22/023 |
| 10,501,038 | B2 | 12/2019 | Jaradi et al. | |
| 2006/0220426 | A1 * | 10/2006 | Moffatt | B60N 2/42736 297/216.19 |
| 2008/0054703 | A1 | 3/2008 | Okazaki | |
| 2008/0246318 | A1 * | 10/2008 | Bothe | B60R 16/037 297/217.3 |
| 2013/0200195 | A1 * | 8/2013 | Ono | B60R 22/34 242/382 |
| 2019/0135226 | A1 | 5/2019 | Maekawa et al. | |
| 2019/0241152 | A1 | 8/2019 | Ohno | |
| 2019/0299896 | A1 * | 10/2019 | Nagasawa | B60R 22/46 |

FOREIGN PATENT DOCUMENTS

| | | |
|---|---|---|
| JP | H01-229744 A | 9/1989 |
| JP | H05-301560 A | 11/1993 |
| JP | H06-72285 A | 3/1994 |
| JP | H11-139250 A | 5/1999 |
| JP | 2007-253734 A | 10/2007 |
| JP | 2008-056229 A | 3/2008 |
| JP | 2009-234314 A | 10/2009 |
| JP | 2010-179726 A | 8/2010 |
| JP | 2015-127199 A | 7/2015 |
| JP | 2017-132366 A | 8/2017 |
| WO | 2018/167945 A1 | 9/2018 |

* cited by examiner

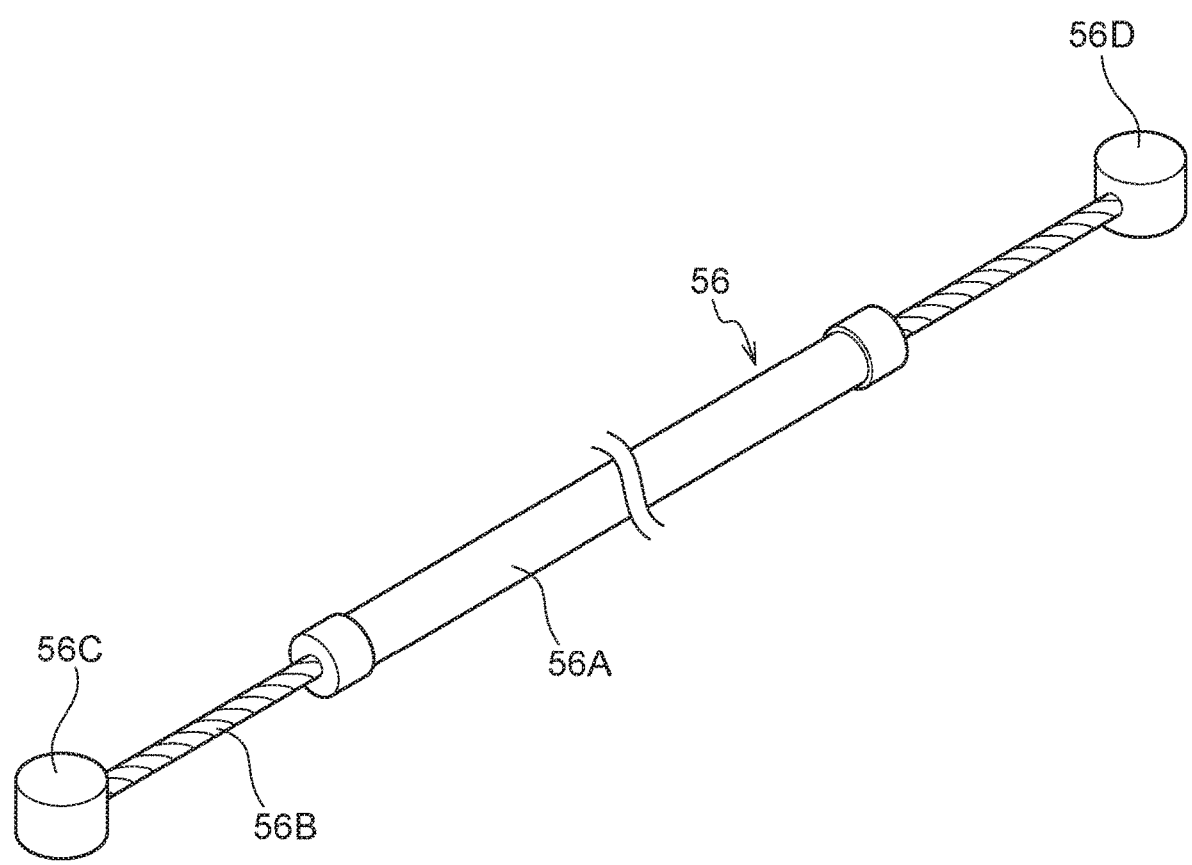

VEHICLE OCCUPANT RESTRAINT DEVICE

CROSS-REFERENCE TO RELATED APPLICATION

This application is based upon and claims the benefit of priority of the prior Japanese Patent Application No. 2018-018545, filed on Feb. 5, 2018, the entire contents of which are incorporated herein by reference.

FIELD

The embodiments discussed herein are related to a vehicle occupant restraint device.

BACKGROUND

Patent Document 1 (Japanese Patent Application Laid-Open (JP-A) No. 2015-127199) discloses a seatbelt device for a vehicle seat in which a shoulder belt anchor is attached to a shoulder opening at an upper portion of a seatback, namely to an upper frame that couples together a pair of side frames.

Patent Document 2 (JP-A No. 2008-056229) discloses a configuration including a seatbelt shoulder anchor attached to a seat frame of a vehicle seat.

Patent Document 3 (JP-A No. H11-139250) discloses a structure for a seatbelt device in which a seatbelt retractor is installed inside a seatback of a reclining seat. In this structure, a stopper is provided to restrict rearward tilting of the seatback beyond an appropriate use range of a seatbelt when the seatbelt is being worn. Patent Document 4 (JP-A No. 2010-179726) discloses a structure in which a shoulder belt anchor provided to a center pillar is moved upward in a collision or when a collision has been predicted in order to suppress the upper body of an occupant from tilting forward violently in a collision. Patent Document 5 (JP-A No. 2007-253734) discloses a seatbelt device in which the position of a shoulder belt anchor provided to a center pillar is displaced downward when a frontal collision of a vehicle has been detected or predicted.

In reclining vehicle seats such as those in Patent Document 1 (JP-A No. 2015-127199) and Patent Document 2 (JP-A No. 2008-056229), the upper body of an occupant sitting in the vehicle seat is, for example, offset with respect to the center of rotation of the seatback. Accordingly, in seatbelt devices in which a shoulder belt anchor is attached to a shoulder opening of the seatback of the vehicle seat, if the seatback is tilted heavily rearward, the shoulder anchor moves toward the upper side of the seatback relative to the occupant sitting in the vehicle seat. There is therefore a possibility of poor performance of the shoulder belt during initial restraint of the occupant in a frontal collision (in other words, a front-on collision), and a possibility that the occupant could slip out from the shoulder belt in a rear collision (in other words, a rear-on collision). There is therefore room for improvement.

SUMMARY

In consideration of the above circumstances, an object of the present disclosure is to obtain a vehicle occupant restraint device capable of reducing the possibility of poor performance of a shoulder belt during initial restraint of an occupant in a frontal collision, and also capable of reducing the possibility of the occupant slipping out from the shoulder belt in a rear collision.

A vehicle occupant restraint device according to a first aspect includes a three-point seatbelt device, a shoulder belt anchor, and a mover device. The three-point seatbelt device includes a shoulder belt extending from an upper portion on one seat width direction end side of a seatback configuring a vehicle seat on which an occupant sits, toward a buckle at a lower portion on another seat width direction end side. The shoulder belt anchor is provided for the shoulder belt to pass through at a shoulder opening on the one seat width direction end side of an upper section of the seatback. The mover device moves the shoulder belt anchor toward a top-to-bottom direction lower side of the seatback when the seatback, which is configured to tilt rearward from an upright state, has been tilted rearward by at least a predetermined angle or greater with respect to a vertical direction.

Here, "when the seatback has been tilted rearward by at least a predetermined angle or greater with respect to a vertical direction" includes cases in which the shoulder belt anchor is moved toward the top-to-bottom direction lower side of the seatback coupled to rearward tilting of the seatback, and cases in which the shoulder belt anchor is moved toward the top-to-bottom direction lower side of the seatback after the seatback has been tilted rearward by the predetermined angle or greater with respect to the vertical direction.

In the vehicle occupant restraint device according to the first aspect, the shoulder belt of the three-point seatbelt device extends from the upper portion on the one seat width direction end side of the seatback toward the buckle at the lower portion on the other seat width direction end side. The shoulder belt anchor is provided on the shoulder opening on the one seat width direction end side of the upper section of the seatback, and the shoulder belt is passed through the shoulder belt anchor. When the seatback has been tilted rearward by at least the predetermined angle or greater with respect to the vertical direction, the mover device moves the shoulder belt anchor toward the top-to-bottom direction lower side of the seatback. Accordingly, in a state in which the seatback has been tilted heavily rearward with respect to the vertical direction, the shoulder belt passing through the shoulder belt anchor moves toward the top-to-bottom direction lower side of the seatback together with the shoulder belt anchor, such that the occupant is restrained by the shoulder belt. Accordingly, the possibility of poor performance of the shoulder belt during initial restraint of the occupant in a frontal collision, and the possibility of the occupant slipping out from the shoulder belt in a rear collision, can be reduced.

A vehicle occupant restraint device according to a second aspect is the vehicle occupant restraint device of the first aspect, wherein the mover device moves the shoulder belt anchor toward the top-to-bottom direction lower side of the seatback coupled to rearward tilting of the seatback.

In the vehicle occupant restraint device according to the second aspect, the mover device moves the shoulder belt anchor toward the top-to-bottom direction lower side of the seatback coupled to rearward tilting of the seatback, enabling the occupant to be restrained appropriately according to the angle of rearward tilting of the seatback with respect to the vertical direction.

A vehicle occupant restraint device according to a third aspect is the vehicle occupant restraint device of the first aspect, wherein the mover device moves the shoulder belt anchor toward the top-to-bottom direction lower side of the seatback after the seatback has been tilted rearward by a predetermined angle or greater with respect to the vertical direction.

In the vehicle occupant restraint device according to the third aspect, the mover device moves the shoulder belt anchor toward the top-to-bottom direction lower side of the seatback after the seatback has been tilted rearward by the predetermined angle or greater with respect to the vertical direction. This thereby enables the occupant to be restrained appropriately according to the angle of rearward tilting of the seatback with respect to the vertical direction.

A vehicle occupant restraint device according to a fourth aspect is the vehicle occupant restraint device of the second aspect, wherein the mover device includes a push-pull wire coupling the shoulder belt anchor to part of a seat cushion provided at the vehicle seat.

The vehicle occupant restraint device according to the fourth aspect includes the push-pull wire coupling the shoulder belt anchor to part of the seat cushion. For example, the shoulder belt anchor is pulled by the push-pull wire coupled to rearward tilting of the seatback, thus moving the shoulder belt anchor toward the top-to-bottom direction lower side of the seatback. This thereby enables the occupant to be restrained appropriately according to the angle of rearward tilting of the seatback with respect to the vertical direction using a simple configuration.

A vehicle occupant restraint device according to a fifth aspect is the vehicle occupant restraint device according to the second aspect, wherein the mover device includes an electrical adjustment device that moves the shoulder belt anchor coupled to rearward tilting of the seatback.

In the vehicle occupant restraint device according to the fifth aspect, the electrical adjustment device moves the shoulder belt anchor toward the vehicle vertical direction lower side coupled to rearward tilting of the seatback. Employing the electrical adjustment device enables, for example, a reduction in costs in comparison to cases in which the shoulder belt anchor is moved coupled to rearward tilting of the seatback by a mechanical configuration.

A vehicle occupant restraint device according to a sixth aspect is the vehicle occupant restraint device of the third aspect, wherein the mover device includes an electrical adjustment device that moves the shoulder belt anchor after the seatback has been tilted rearward by a predetermined angle or greater with respect to the vertical direction.

In the vehicle occupant restraint device according to the sixth aspect, the electrical adjustment device moves the shoulder belt anchor toward the vehicle vertical direction lower side after the seatback has been tilted rearward by the predetermined angle or greater with respect to the vertical direction. Employing the electrical adjustment device enables, for example, a reduction in costs in comparison to cases in which the shoulder belt anchor is moved coupled to rearward tilting of the seatback by a mechanical configuration.

A vehicle occupant restraint device according to a seventh aspect is the vehicle occupant restraint device of either the fifth aspect or the sixth aspect, further including a camera that is provided within a vehicle cabin and that images a head of the occupant sitting in the vehicle seat. The electrical adjustment device is controlled according to the position of a head of the occupant imaged by the camera.

In the vehicle occupant restraint device according to the seventh aspect, the head of the occupant sitting in the vehicle seat is imaged by the camera, and the electrical adjustment device is controlled so as to move the shoulder belt anchor toward the vehicle vertical direction lower side according to the position of the head of the occupant imaged by the camera. This thereby enables the occupant to be restrained appropriately according to the position of the head of the occupant sitting in the vehicle seat.

A vehicle occupant restraint device according to an eighth aspect is the vehicle occupant restraint device of the fourth aspect, wherein the push-pull wire includes an outer tube that is disposed within the seatback and an inner wire that is capable of moving within the outer tube and that that moves the shoulder belt anchor toward the top-to-bottom direction lower side of the seatback.

In the vehicle occupant restraint device according to the eighth aspect, the inner wire is capable of moving within the outer tube, and the inner wire moves the shoulder belt anchor toward the top-to-bottom direction lower side of the seatback. This thereby enables the occupant to be restrained appropriately according to the angle of rearward tilting of the seatback with respect to the vertical direction using a simple configuration.

A vehicle occupant restraint device according to a ninth aspect is the vehicle occupant restraint device of the eighth aspect, wherein a terminal portion on one end side of the inner wire is capable of hooking onto a seat cushion frame provided within the seat cushion, and a terminal portion on another end side of the inner wire is joined to an operation portion configured to move the shoulder anchor toward the top-to-bottom direction lower side.

In the vehicle occupant restraint device according to the ninth aspect, the terminal portion on the one end side of the inner wire hooks onto the seat cushion frame within the seat cushion. Moreover, the operation portion joined to the terminal portion on the other end side of the inner wire moves the shoulder belt anchor toward the top-to-bottom direction lower side. This thereby enables the occupant to be restrained appropriately according to the angle of rearward tilting of the seatback with respect to the vertical direction using a simple configuration.

The vehicle occupant restraint device according to the present disclosure is capable of reducing the possibility of poor performance of the shoulder belt during initial restraint of an occupant in a frontal collision, and is also capable of reducing the possibility of the occupant slipping out from the shoulder belt in a rear collision.

BRIEF DESCRIPTION OF THE DRAWINGS

Exemplary embodiments will be described in detail based on the following figures, wherein:

FIG. 6 is a perspective view illustrating a push-pull wire of a mover device employed in a vehicle occupant restraint device according to the first exemplary embodiment;

DESCRIPTION OF EMBODIMENTS

Figure 1:
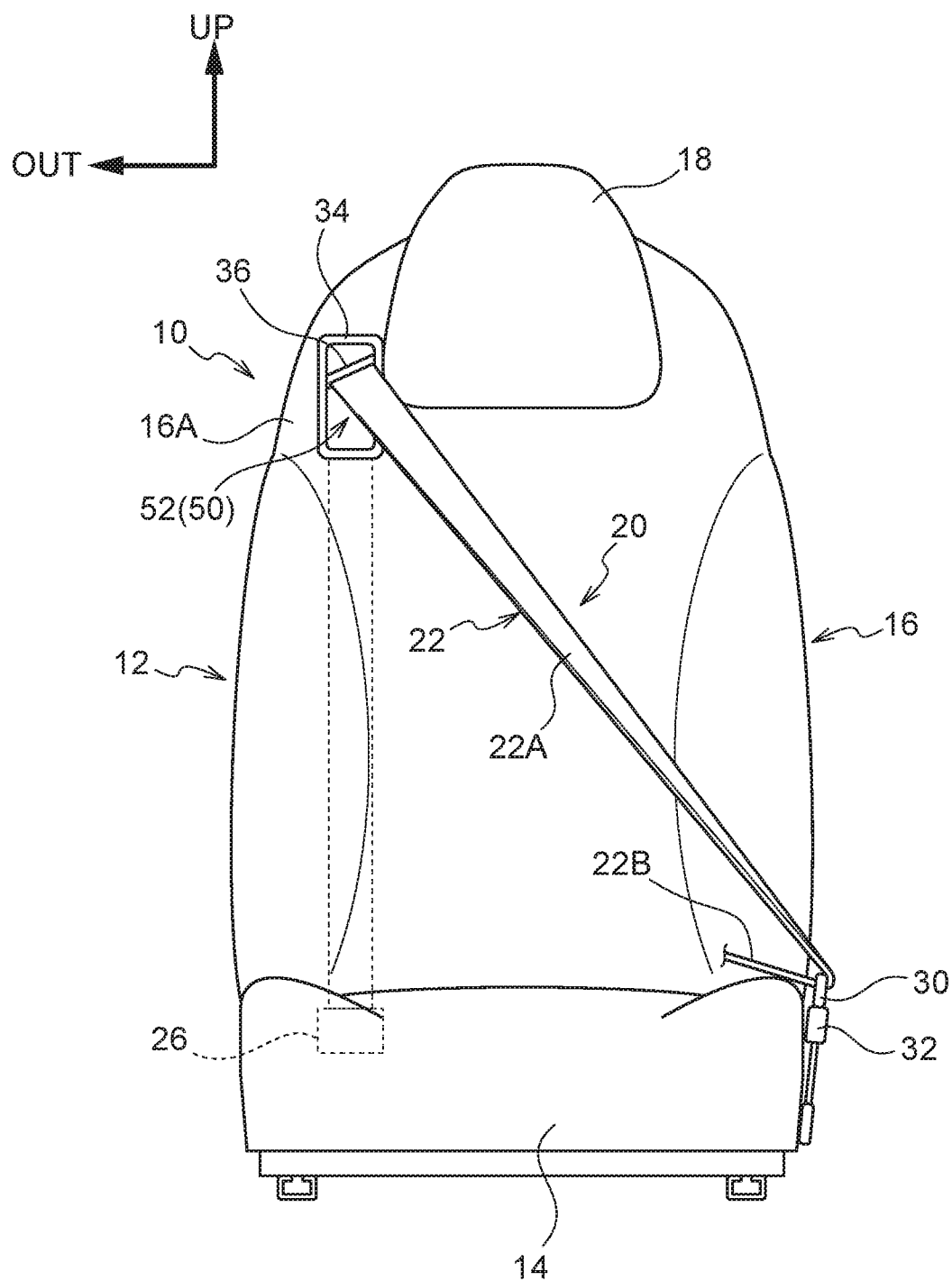
FIG. 1 is a schematic front view illustrating a vehicle seat provided with a vehicle occupant restraint device according to a first exemplary embodiment.

Detailed explanation follows regarding exemplary embodiments of the present disclosure, with reference to the drawings. In the drawings, the arrow FR indicates a vehicle front side, the arrow UP indicates a vehicle upper side, and the arrow OUT indicates a vehicle width direction outer side, as appropriate. In the exemplary embodiments of the present disclosure, a seat front direction, a seat width direction, and a seat upward direction respectively correspond to a vehicle front direction, a vehicle width direction, and a vehicle upward direction, and are therefore similarly referred to as the vehicle front direction, the vehicle width direction, and the vehicle upward direction.

First Exemplary Embodiment

Explanation follows regarding a vehicle occupant restraint device according to a first exemplary embodiment, with reference to FIG. 1 to FIG. 12. The drawings are schematic in nature, and components not relevant to the present disclosure are omitted from illustration. Moreover, an occupant P, described later, is omitted from illustration in FIG. 1.

Vehicle Occupant Restraint Device Configuration

Figure 2:
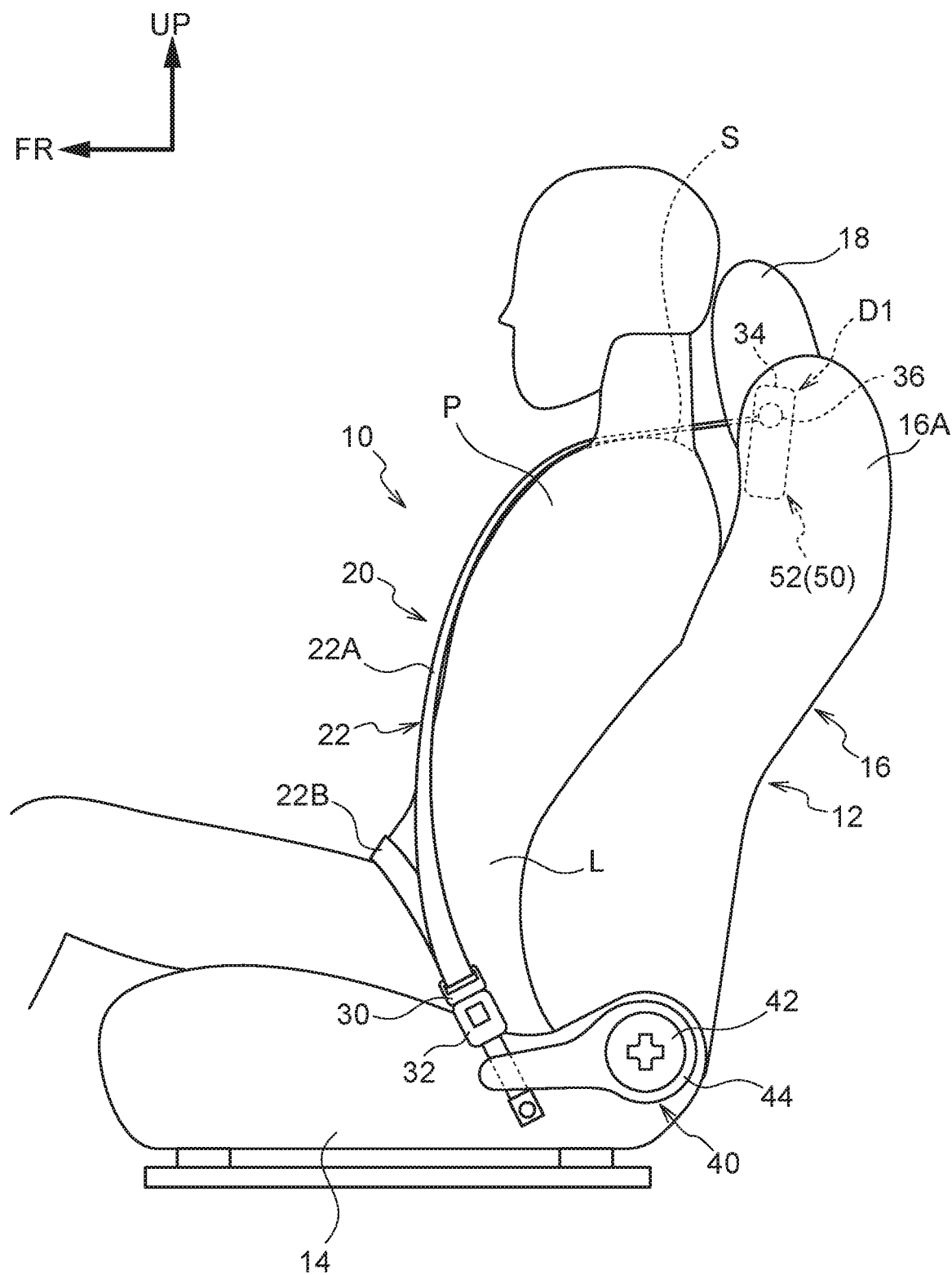
FIG. 2 is a side view illustrating a state in which an occupant sitting in a vehicle seat with a seatback in an upright state is being restrained by a vehicle occupant restraint device according to the first exemplary embodiment.

As illustrated in FIG. 1 and FIG. 2, a vehicle occupant restraint device 10 according to the first exemplary embodiment is provided to a driver's seat side vehicle seat (referred to hereafter simply as "seat") 12 configured by a front seat on the right side of a vehicle cabin.

The seat 12 includes a seat cushion 14 on which the occupant P (see FIG. 2) sits, a seatback 16 provided at a rear end portion of the seat cushion 14 to support the back of the occupant P, and a headrest 18 disposed at an upper end portion of the seatback 16 to support the head of the occupant P. A vehicle width direction outer side shoulder opening 34 of an upper portion 16A of the seatback 16 is provided with a shoulder belt anchor (referred to hereafter as "shoulder anchor") 36 through which a seatbelt (namely, webbing) 22, described later, is passed. The occupant P (see FIG. 2) sitting in the seat 12 is illustrated as a dummy.

A seatbelt device 20 provided to the seat 12 is what is referred to as a three-point seatbelt device, and includes a seatbelt 22 and an anchor plate (not illustrated in the drawings) to which one end of the seatbelt 22 is anchored at a vehicle width direction outer side of the seat cushion 14. The seatbelt device 20 includes a retractor 26 to which the other end of the seatbelt 22 is anchored, and that is provided with a pre-tensioner function to apply a predetermined tension to the seatbelt 22. The seatbelt 22 is folded back on itself toward the retractor 26 at the shoulder anchor 36 at the vehicle width direction outer side of the upper portion 16A of the seatback 16. The seatbelt device 20 further includes a buckle 32, into which a tongue plate 30 through which the seatbelt 22 is passed, is fitted and fixed.

A portion of the seatbelt 22 spanning from the shoulder anchor 36 to the buckle 32 is referred to as a shoulder belt 22A, and a portion of the seatbelt 22 spanning from the buckle 32 to the anchor plate (not illustrated in the drawings) is referred to as a lap belt 22B.

The shoulder belt 22A runs diagonally so as to restrain the occupant P from the front between a shoulder S at a vehicle width direction outer upper portion of the occupant P (see FIG. 2) sitting in the seat 12 and a lumbar region L at a vehicle width direction inner side lower portion of the occupant P. The vehicle width direction outer side of the seat 12 is an example of one end side in the seat width direction. The vehicle width direction inner side of the seat 12 is an example of another end side in the seat width direction.

Figure 3:
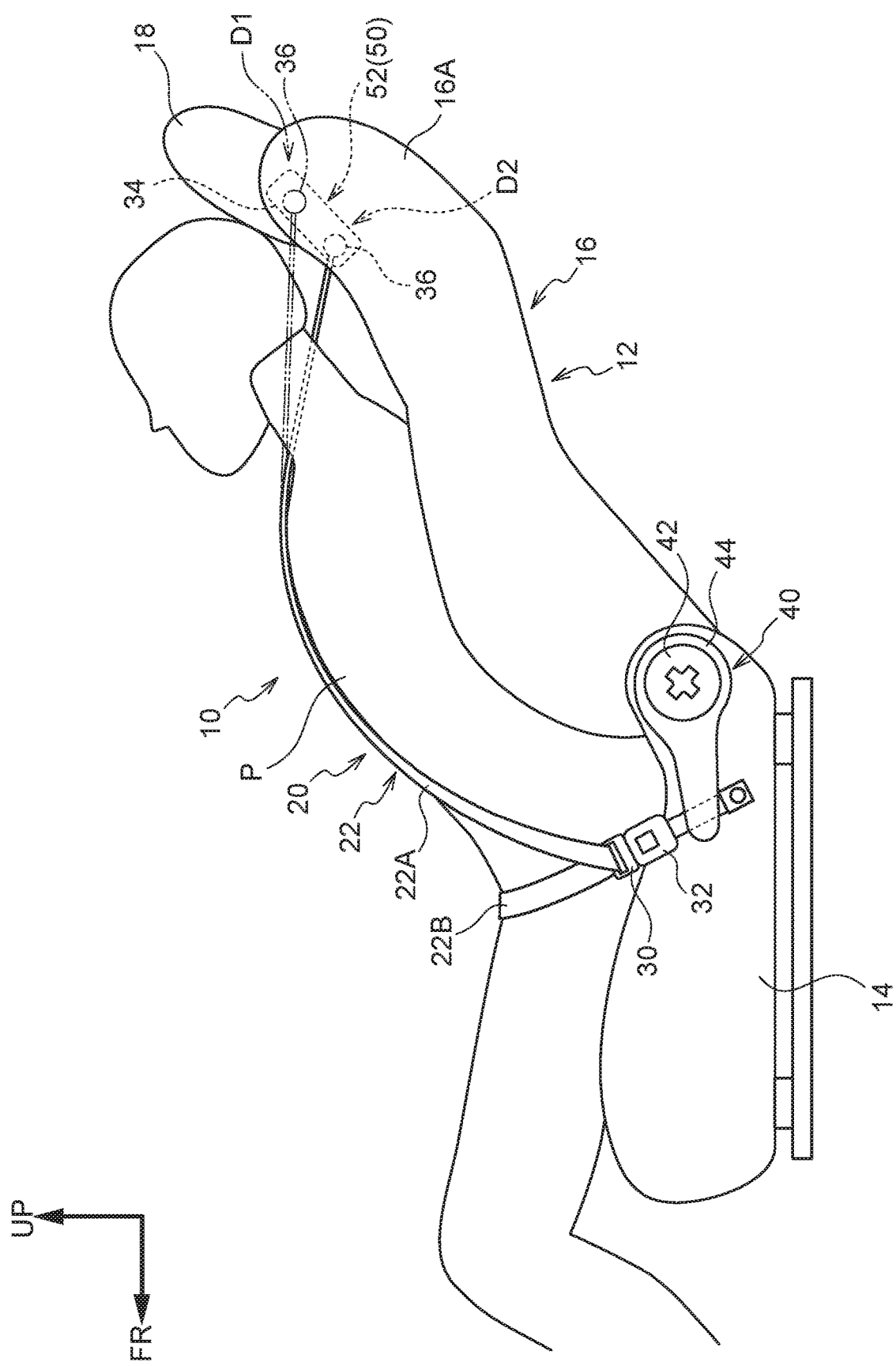
FIG. 3 is a side view illustrating a state in which an occupant sitting in a vehicle seat with a seatback in a rearward tilted state is being restrained by a vehicle occupant restraint device according to the first exemplary embodiment.

As illustrated in FIG. 2 and FIG. 3, the seat 12 has a reclining function to tilt the seatback 16 rearward from an upright state (namely, recline the seatback 16 toward the vehicle rear). More specifically, the seat 12 includes a reclining device 40 that changes an angle α (see FIG. 4) of the seatback 16 with respect to a vertical direction. For example, the reclining device 40 includes a rotation section (for example, a reclining rod) 42 coupled to a rod 41 (see FIG. 5) disposed along the vehicle width direction at a lower end portion of the seatback 16, a guide section 44 that rotatably supports the rotation section 42, and a drive section (not illustrated in the drawings) that rotates the rotation section 42. The guide section 44 is provided at side portions of the seat cushion 14. The drive section that rotates the rotation section 42 is, for example, configured by a motor or the like.

The vehicle occupant restraint device 10 includes a mover device 50 that moves the shoulder anchor 36 substantially in a top-to-bottom direction of the seatback 16. As illustrated in FIG. 2, in an upright state of the seatback 16, the shoulder anchor 36 is disposed at a normal position D1 at the top-to-bottom direction upper side of the seatback 16. As illustrated in FIG. 3, when the seatback 16 has been tilted rearward by a predetermined angle (for example 30°) or greater with respect to the vertical direction, the mover device 50 moves the shoulder anchor 36 to a moved position D2 toward the top-to-bottom direction lower side of the seatback 16.

Figure 4:
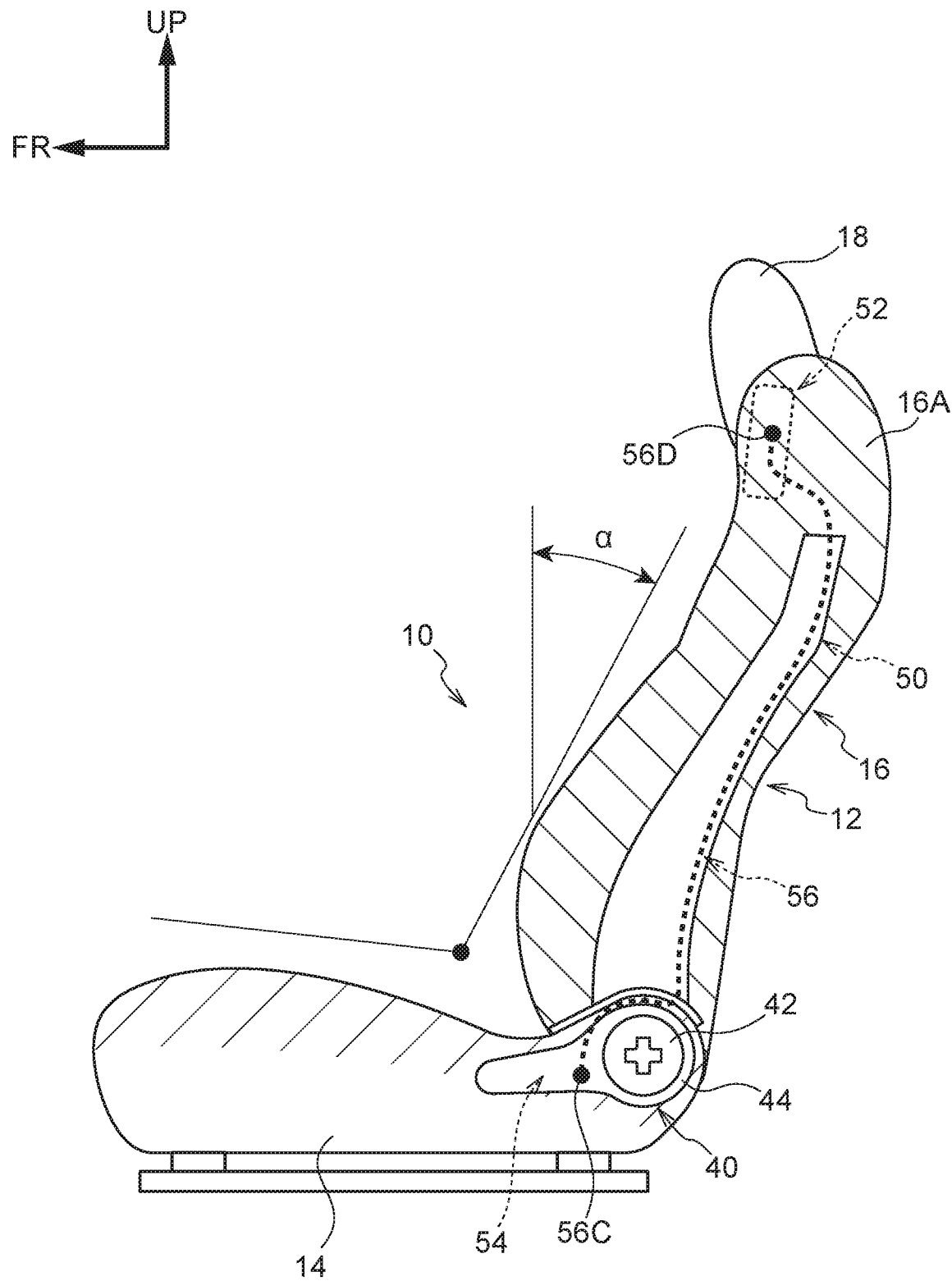
FIG. 4 is a schematic vertical cross-section illustrating a mover device employed in a vehicle occupant restraint device according to the first exemplary embodiment.
Figure 5:
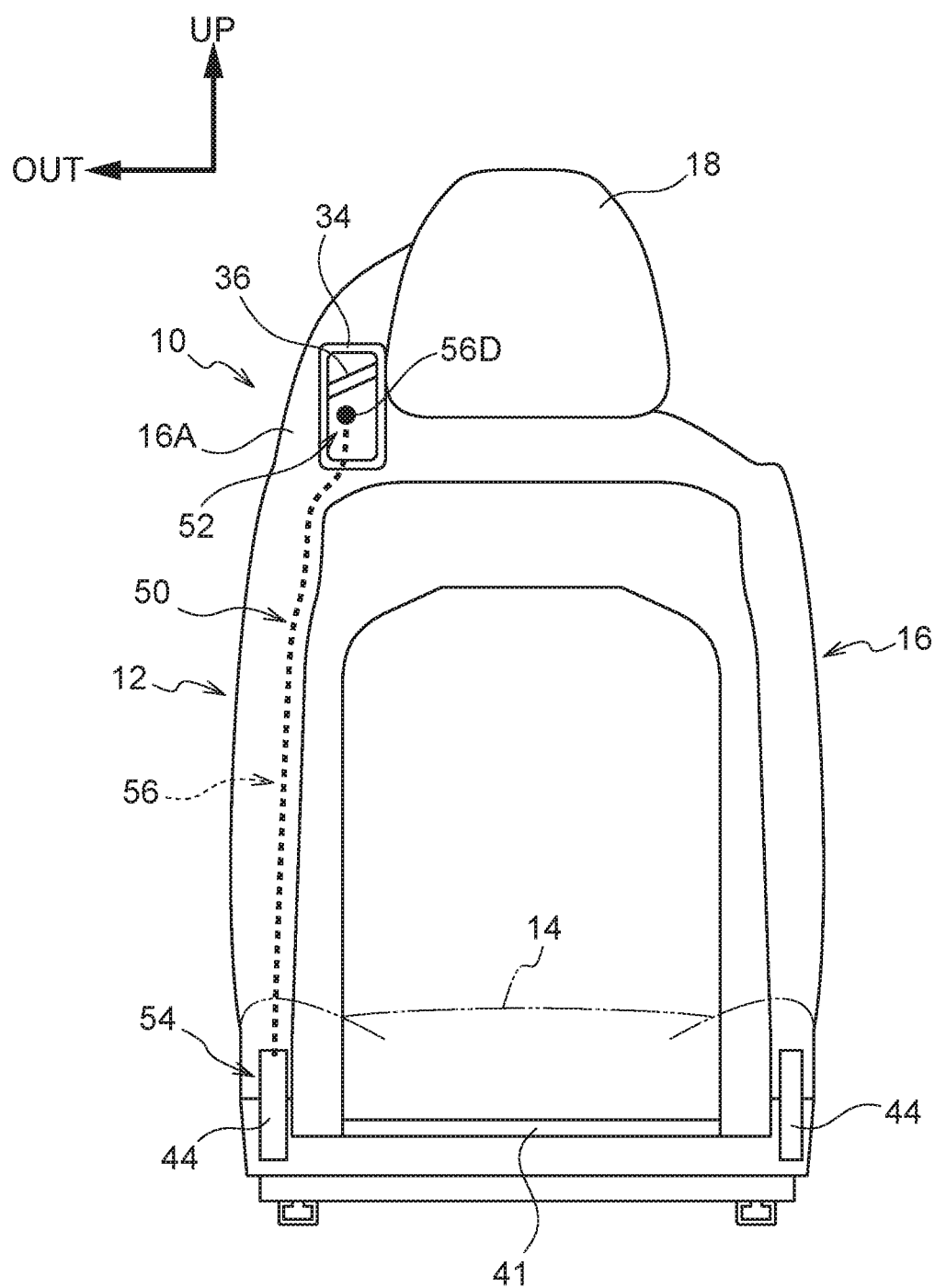
FIG. 5 is a schematic front view illustrating a mover device employed in a vehicle occupant restraint device according to the first exemplary embodiment.

As illustrated in FIG. 4 and FIG. 5, the mover device 50 includes an upper movement section 52 that moves the shoulder anchor 36 at the upper portion 16A of the seatback 16, and a lower movement section 54 provided as a portion at the vehicle front-rear direction rear of the seat cushion 14. The mover device 50 further includes a push-pull wire 56 that couples the shoulder anchor 36 to a seat cushion frame 60 of the seat cushion 14 (see FIG. 7A, FIG. 7B) through the upper movement section 52. The upper movement section 52 is provided within the seatback 16, and the lower movement section 54 is provided within the seat cushion 14. The push-pull wire 56 is disposed straddling from within the seat cushion 14 to within the seatback 16. The push-pull wire 56 extends substantially in the vehicle vertical direction in a vehicle width direction outer side portion of the seatback 16 (see FIG. 5).

As illustrated in FIG. 6, the push-pull wire 56 includes an outer tube 56A extending along the length direction of the push-pull wire 56, and an inner wire 56B passing through the inside of the outer tube 56A and capable of moving along the length direction of the outer tube 56A. The two length direction end portions of the inner wire 56B are respectively provided with terminal portions 56C, 56D having a larger external diameter than the external diameter of the inner wire 56B.

Figure 7A:
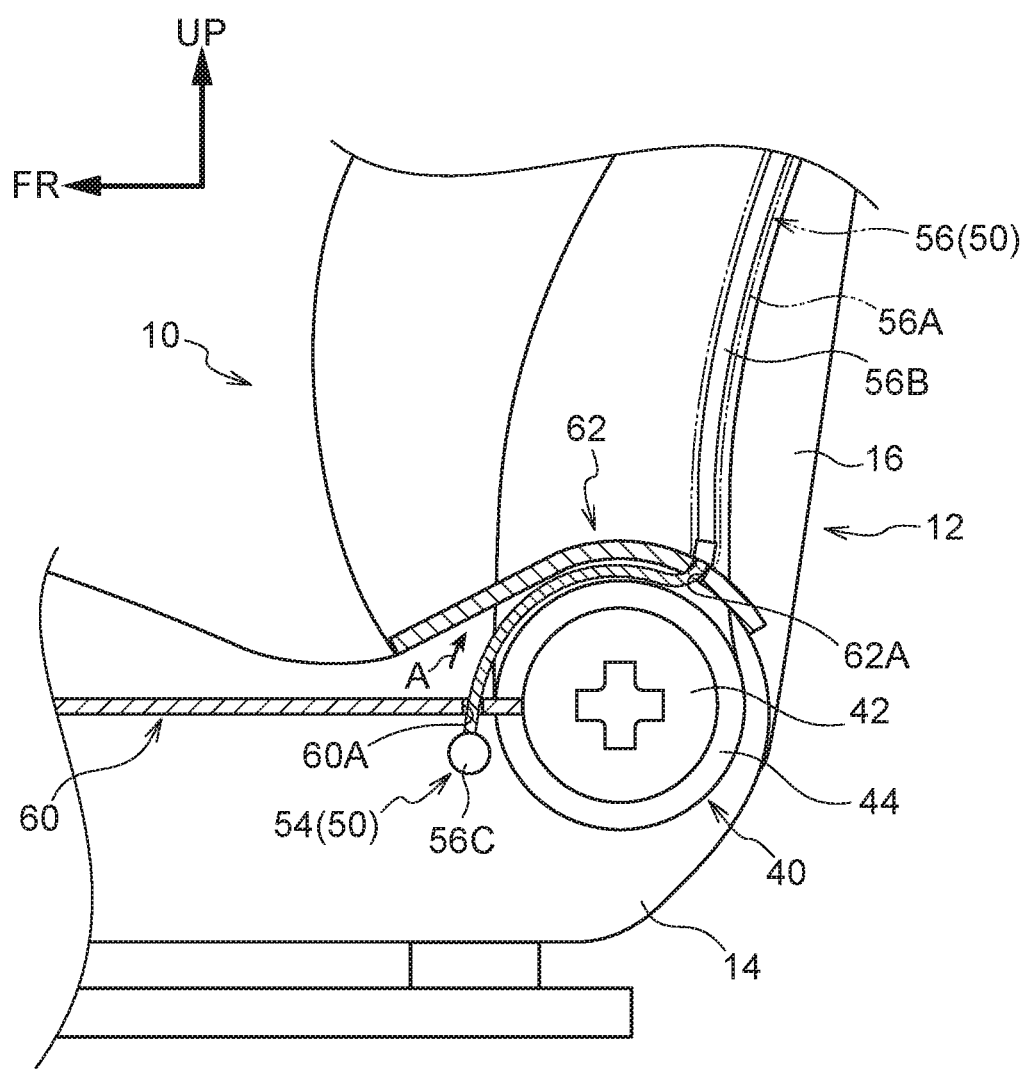
FIG. 7A is a cross-section illustrating a seat cushion-side attachment structure of a push-pull wire of a mover device employed in a vehicle occupant restraint device according to the first exemplary embodiment, illustrating a seatback when in an upright state.
Figure 7B:
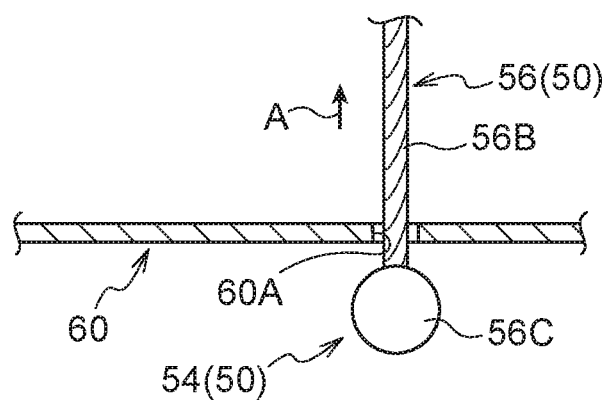
FIG. 7B is an enlarged cross-section illustrating a seat cushion frame and one length direction end portion of a push-pull wire of a mover device employed in a vehicle occupant restraint device according to the first exemplary embodiment.

As illustrated in FIG. 7A and FIG. 7B, the seat cushion frame 60 is disposed running substantially in the vehicle front-rear direction within a vehicle width direction outer side portion of the seat cushion 14. The lower movement section 54 includes a circular through hole 60A formed in a rear end portion of the seat cushion frame 60. The inner wire 56B of the push-pull wire 56 passes through the through hole 60A. The terminal portion 56C at one length direction end side of the inner wire 56B is disposed at the vehicle vertical direction lower side of the through hole 60A, and the external diameter of the terminal portion 56C is larger than the internal diameter of the through hole 60A. Accordingly, when the inner wire 56B is pulled toward the vehicle upper side indicated by the arrow A, the terminal portion 56C of the inner wire 56B hooks onto an edge of the through hole 60A (see FIG. 8). Namely, the terminal portion 56C on the one length direction end side of the inner wire 56B functions as a stopper to restrict movement of the inner wire 56B toward the vehicle upper side.

As illustrated in FIG. 7A, the lower movement section 54 includes a guide plate 62 disposed at the vehicle vertical direction upper side of the guide section 44 at a spacing from the guide section 44. The guide plate 62 is provided in a recessed alcove formed in a lower end portion of the seatback 16. The inner wire 56B extending toward the upper side of the seat cushion frame 60 is disposed between the guide plate 62 and the guide section 44. A through hole 62A is formed in a rear end portion of the guide plate 62, and the inner wire 56B passes through the through hole 62A so as to be capable of moving along its length direction. One length direction end portion of the outer tube 56A of the push-pull wire 56 is fixed to an upper edge of the through hole 62A of the guide plate 62.

Figure 8:
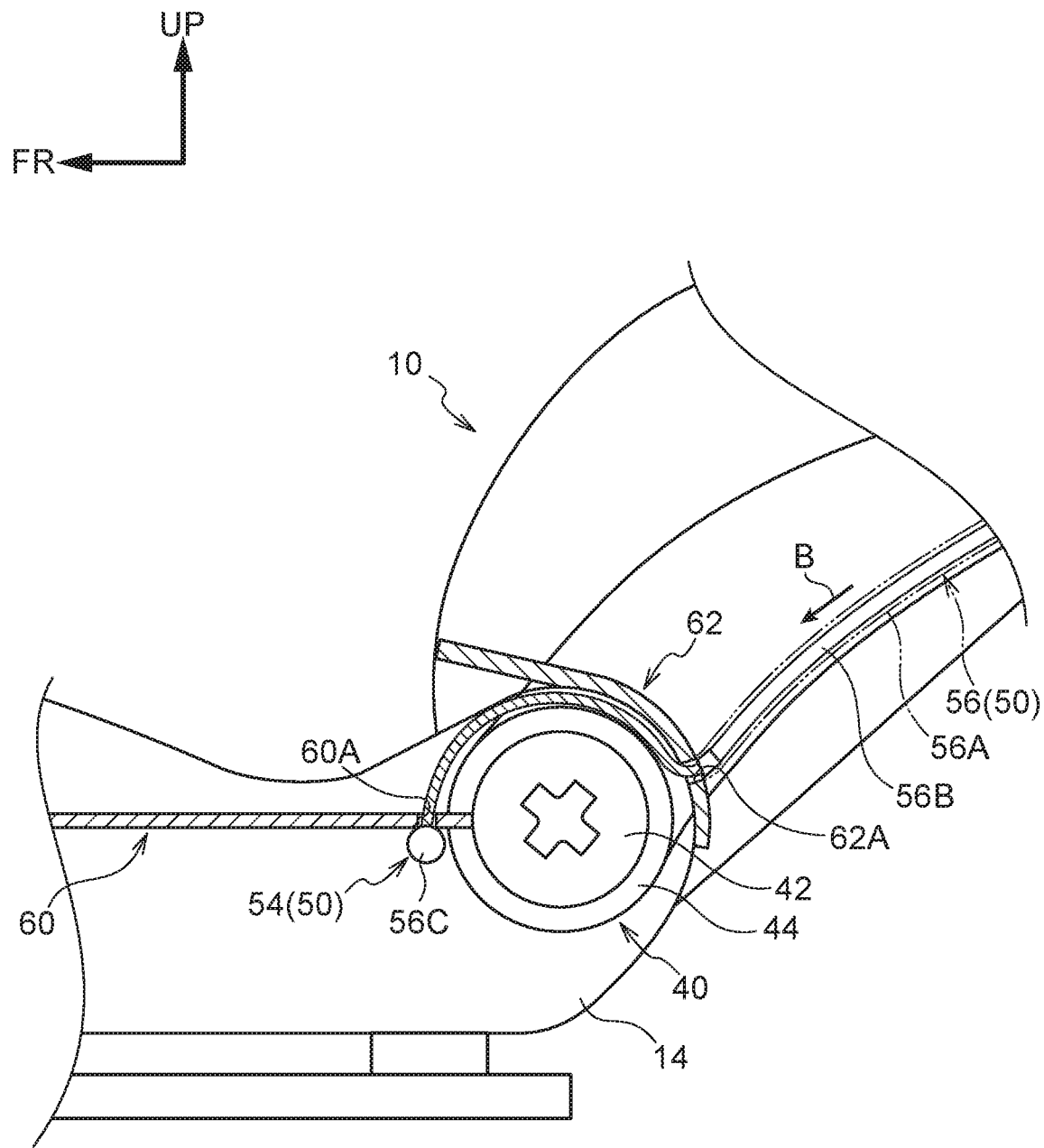
FIG. 8 is a cross-section illustrating a seat cushion-side attachment structure of a push-pull wire of a mover device employed in a vehicle occupant restraint device according to the first exemplary embodiment, illustrating a seatback when in a rearward tilted state.
Figure 9:
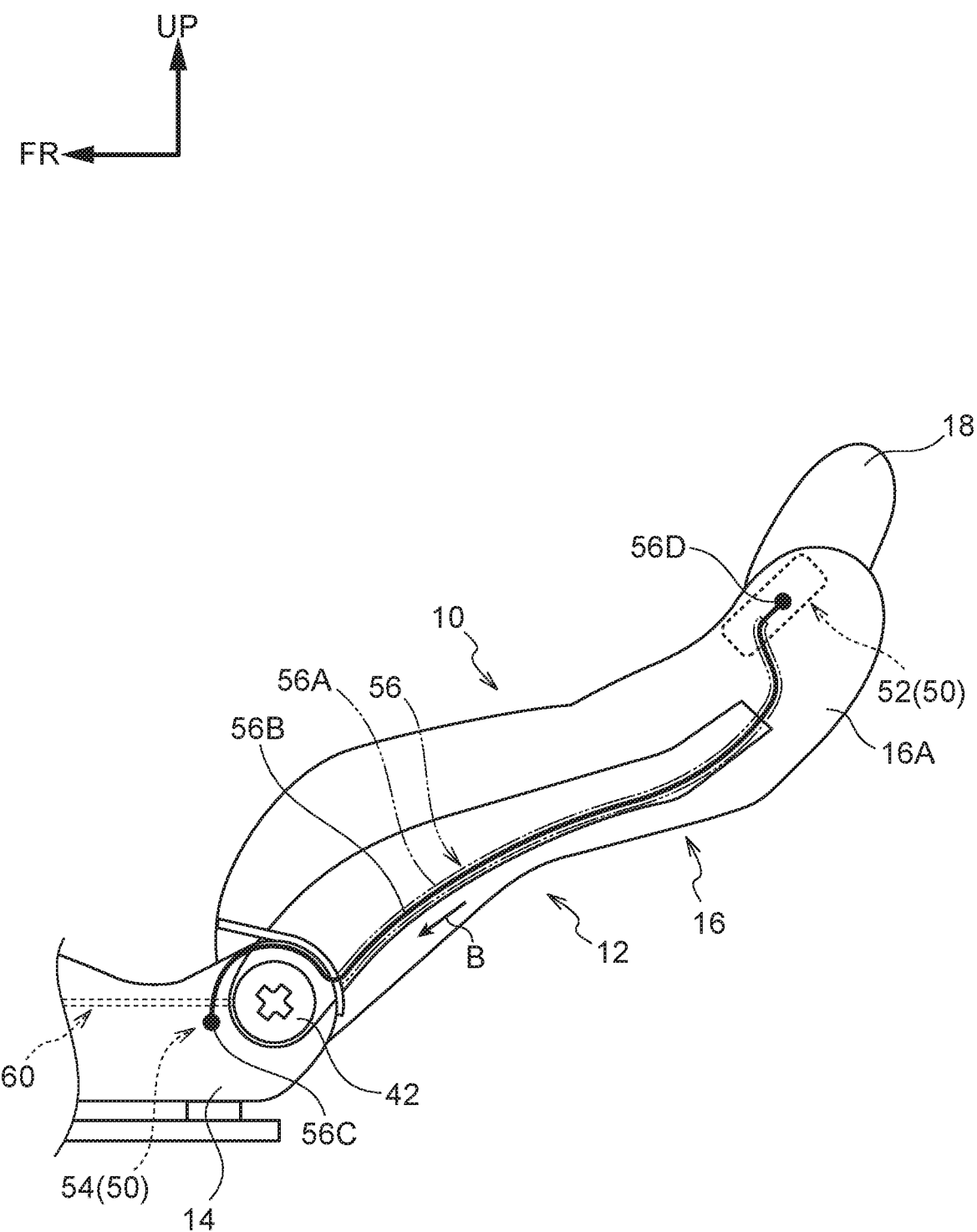
FIG. 9 is a schematic side view illustrating a mover device employed in a vehicle occupant restraint device according to the first exemplary embodiment when a seatback is in a rearward tilted state.

When the seatback 16 is tilted rearward with respect to the vertical direction, the guide plate 62 moves toward the vehicle rear, following the guide section 44 (see FIG. 8). When this occurs, the guide section 44 is fixed to the seat cushion 14, and the guide plate 62 moves toward the vehicle rear with respect to the guide section 44. Accordingly, the length direction length of the inner wire 56B disposed between the guide plate 62 and the guide section 44 increases, and the inner wire 56B is pulled toward the vehicle upper side indicated by arrow A (see FIG. 7A), such that the terminal portion 56C of the inner wire 56B hooks onto the edge of the through hole 60A. Then, as illustrated in FIG. 8 and FIG. 9, when the seatback 16 is tilted further rearward with respect to the vertical direction, the inner wire 56B is pulled toward the vehicle lower side indicated by arrow B with respect to the outer tube 56A. The inner wire 56B accordingly moves the upper movement section 52 toward the vehicle lower side.

Figure 10:
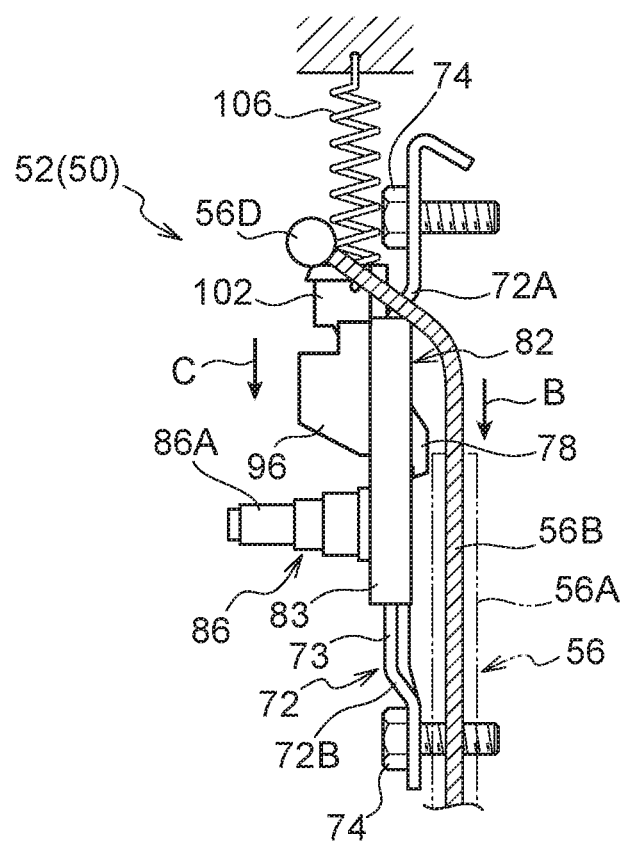
FIG. 10 is a side view illustrating a shoulder belt anchor-side attachment structure of a push-pull wire of a mover device employed in a vehicle occupant restraint device according to the first exemplary embodiment.
Figure 11:
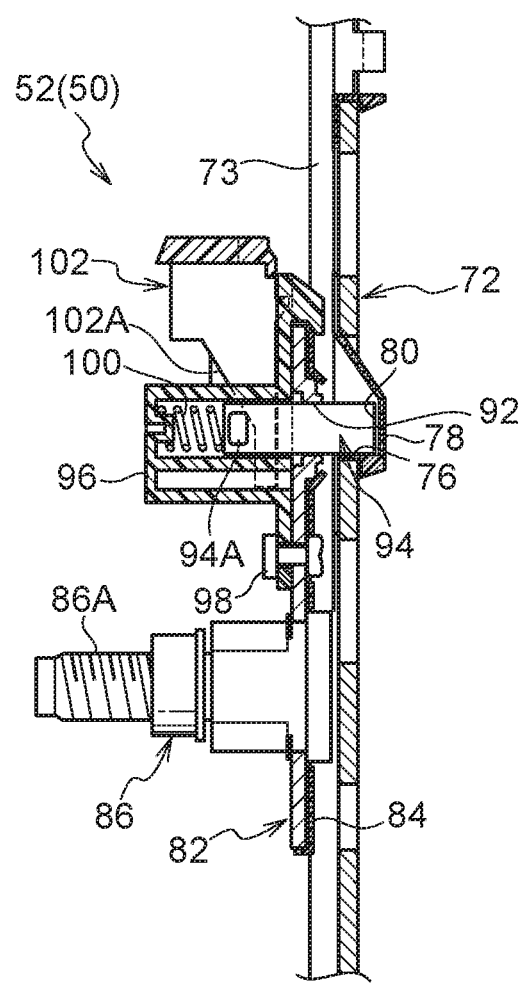
FIG. 11 is a cross-section illustrating a shoulder belt anchor-side attachment structure of a push-pull wire of a mover device employed in a vehicle occupant restraint device according to the first exemplary embodiment.
Figure 12:
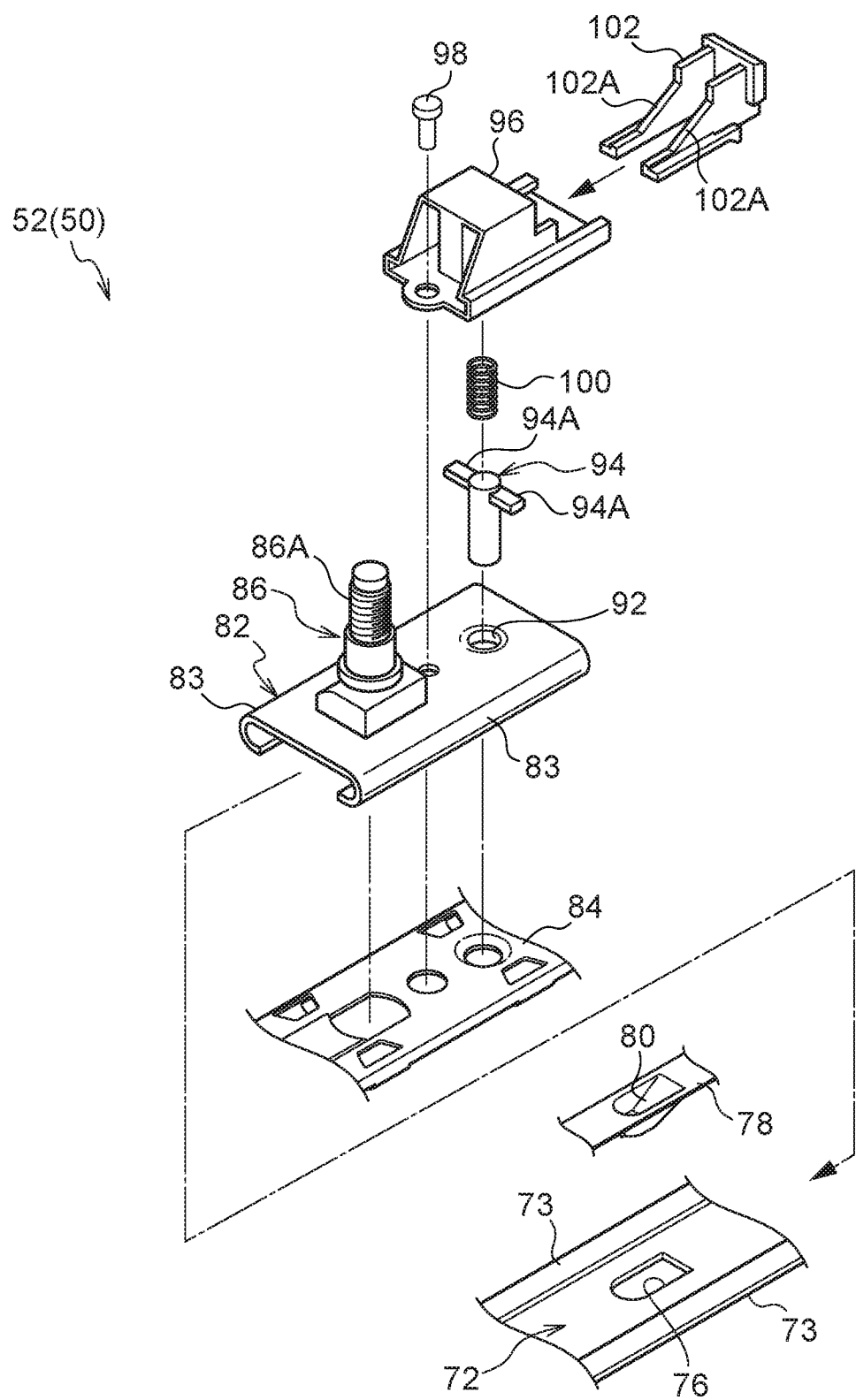
FIG. 12 is an exploded perspective view illustrating a shoulder belt anchor-side attachment structure of a push-pull wire of a mover device employed in a vehicle occupant restraint device according to the first exemplary embodiment.

As illustrated in FIG. 10 to FIG. 12, the upper movement section 52 includes an elongated plate shaped guide rail 72 fixed to the seatback 16, and a slider 82 that moves substantially in the top-to-bottom direction of the seatback 16 along the guide rail 72. Rails 73 are formed at both width direction ends of the guide rail 72. Bolts 74 pass through the two length direction ends of the guide rail 72. The bolts 74 are fastened and fixed to an upper frame, not illustrated in the drawings, of the seatback 16 using nuts (not illustrated in the drawings), thereby fixing the guide rail 72 to the upper frame of the seatback 16.

Attachment portions 83 with a substantially U-shaped cross-section profile are formed to both width direction ends of the slider 82. The rails 73 of the guide rail 72 are inserted into the respective attachment portions 83 so as to be capable of moving relative to the attachment portions 83. A plate 84, serving as a substantially rectangular thin plate shaped shock absorbing member, is attached to a guide rail 72-side face of the slider 82 (see FIG. 11). The pair of attachment portions 83 are guided by the pair of rails 73, enabling the slider 82 to slide (namely, move) in the top-to-bottom direction of the guide rail 72. Respective stoppers 72A, 72B are formed at upper end side and lower end side of the guide rail 72 in order to restrict the slide range of the slider 82.

A support body 86 is provided at a top-to-bottom direction lower portion side of the slider 82. A leading end portion of the support body 86 is provided with a bolt 86A. Although not illustrated in the drawings, the shoulder anchor 36 (see FIG. 1 etc.) is fastened to the bolt 86A of the support body 86, thereby fixing the shoulder anchor 36 to the slider 82. The shoulder anchor 36 accordingly moves as a unit with the slider 82. An upper portion of the slider 82 is provided with a return spring 106 (see FIG. 10) to return the slider 82 to a position at the top-to-bottom direction upper side of the seatback 16.

As illustrated in FIG. 11 and FIG. 12, a circular through hole 92 is formed at the width direction center of an upper portion of the slider 82. The through hole 92 is exposed to the guide rail 72 side through the plate 84.

A circular column shaped lock pin 94, serving as an engagement member, is fitted into the through hole 92. The lock pin 94 is capable of moving through the through hole 92 along its axial direction. The lock pin 94 is formed with a pair of rectangular column shaped extension portions 94A at portions on the opposite side to the guide rail 72. The pair of extension portions 94A extend from the lock pin 94 toward opposite sides to each other in the width direction of the slider 82.

A substantially box-shaped holder 96 is provided at the width direction center of the upper portion of the slider 82, on the opposite side to the guide rail 72. The holder 96 is engaged with the slider 82 and a rivet 98 is crimped to fix the holder 96 to the slider 82.

The lock pin 94 is retained so as to be capable of moving along its axial direction by a lower portion of the holder 96. The lock pin 94 projects from the holder 96 toward the slider 82 side. A compression coil spring 100, serving as an engagement-biasing member, is housed within a bottom portion of the holder 96. The compression coil spring 100 biases the lock pin 94 toward the slider 82 side.

An operation frame 102, serving as an operation section with a cross-section profile substantially in an inverted U frame shape, is retained by an upper portion of the holder 96. The operation frame 102 is capable of sliding (namely, moving) in the top-to-bottom direction within a predetermined range. At top-to-bottom direction intermediate portions on both width direction sides of the operation frame 102, operation faces 102A are formed at end faces of the operation frame 102 on the opposite side to the slider 82. The operation faces 102A are inclined in a direction toward the opposite side to the slider 82 on progression upward. As illustrated in FIG. 10, the terminal portion 56D on the other length direction end side of the inner wire 56B of the push-pull wire 56 is joined to an upper portion of the operation frame 102 by crimping, adhesion, or the like. Accordingly, when the inner wire 56B is pulled toward the vehicle lower side, indicated by arrow B, the operation frame 102 is pressed down in the direction of arrow C.

As illustrated in FIG. 11, the lock pin 94 is disposed within the operation frame 102, and the pair of extension portions 94A of the lock pin 94 abut lower ends of the pair of operation faces 102A of the operation frame 102 due to the biasing force of the compression coil spring 100 (see FIG. 11). Accordingly, the operation frame 102 is biased toward the upper side so as to be disposed at an upper slide limit position, and such that the lock pin 94 is in a state projecting through the through hole 92 in the slider 82 toward the guide rail 72 side, thereby restricting movement of the lock pin 94 toward the guide rail 72 side.

When the operation frame 102 is pulled by the inner wire 56B (see FIG. 10) and slides toward the lower side (the direction of arrow C in the first exemplary embodiment), the pair of extension portions 94A of the lock pin 94 are pressed toward the opposite side to the slider 82 by the pair of operation faces 102A of the operation frame 102 sliding toward the lower side, such that the lock pin 94 is moved toward the opposite side to the guide rail 72 against the biasing force of the compression coil spring 100. The projection of the lock pin 94 toward the guide rail 72 side through the through hole 92 is thereby released.

As illustrated in FIG. 11, when the lock pin 94 projects toward the guide rail 72 side through the through hole 92 in the slider 82, the lock pin 94 is inserted into a recess 80 in a sheet 78 and into a lock hole 76 in the guide rail 72, such that the lock pin 94 engages with the recess 80 and the lock hole 76. Accordingly, the slider 82 is restricted from sliding toward the lower side along the length direction of the guide rail 72. The slider 82 is thus positioned by the guide rail 72 so as to maintain the height of the shoulder anchor 36.

When the operation frame 102 is pulled by the inner wire 56B (see FIG. 10) and slides toward the lower side (the direction of arrow C in the first exemplary embodiment) and the lock pin 94 moves toward the opposite side to the guide rail 72, the insertion of the lock pin 94 into the recess 80 and the lock hole 76 is released. Accordingly, by releasing the engagement of the lock pin 94 with the recess 80 and the lock hole 76, the slider 82 is permitted to slide along the length direction of the guide rail 72. The operation frame 102 is pulled by the inner wire 56B of the push-pull wire 56, such that the slider 82 slides toward the top-to-bottom direction lower side of the seatback 16 as indicated by arrow C, against the biasing force of the return spring 106 (see FIG. 10). When pulling of the inner wire 56B of the push-pull wire 56 is released, the biasing force of the return spring 106 returns the slider 82 to its original position at the upper side of the guide rail 72.

Operation and Advantageous Effects

Explanation follows regarding operation and advantageous effects of the vehicle occupant restraint device 10 of the first exemplary embodiment.

As illustrated in FIG. 2, in the vehicle occupant restraint device 10, when the seatback 16 is in the upright state, the shoulder anchor 36 is disposed at the normal position D1 at the top-to-bottom direction upper side of the movement range of the mover device 50. In this state, the shoulder belt 22A extending from the shoulder anchor 36 extends from the upper portion of the seat width direction outer side of the seatback 16 toward the lower portion on the seat width direction inner side of the seatback 16. The occupant P sitting in the seat 12 is thus restrained by the seatbelt 22 of the seatbelt device 20.

As illustrated in FIG. 3, the shoulder anchor 36 is moved to the moved position D2 at the top-to-bottom direction lower side of the seatback 16 by the push-pull wire 56 of the mover device 50 (see FIG. 4, etc.) coupled to the rearward tilting of the seatback 16. For example, in a state in which the seatback 16 has been tilted rearward by a predetermined angle (for example 30°) with respect to the vertical direction, once the shoulder anchor 36 has moved from the normal position D1 to the moved position D2, the shoulder anchor 36 is unable to move further toward the top-to-bottom direction lower side than the moved position D2, even if the seatback 16 is tilted further rearward. Namely, the mover device 50 is configured such that the push-pull wire 56 remains at the position of the moved position D2 even if the seatback 16 is tilted further rearward.

More specifically, as illustrated in FIG. 7A, when the seatback 16 is tilted rearward by a particular angle or greater with respect to the vertical direction, in the lower movement section 54 of the mover device 50 the inner wire 56B of the push-pull wire 56 is pulled toward the vehicle vertical direction upper side indicated by arrow A. Then, the terminal portion 56C at the one end side of the inner wire 56B hooks onto the edge of the through hole 60A in the seat cushion frame 60. Following this, as illustrated in FIG. 8, when the seatback 16 is tilted further rearward with respect to the vertical direction, the inner wire 56B is pulled toward the top-to-bottom direction lower side of the seatback 16 indicated by arrow B with respect to the outer tube 56A.

As illustrated in FIG. 10, in the upper movement section 52 of the mover device 50, the locking of the slider 82 by the lock pin 94 (see FIG. 11) is released by pulling the inner wire 56B in the direction of arrow B, such that the slider 82 slides (namely, moves) along the guide rail 72 toward the top-to-bottom direction lower side. The first exemplary embodiment is adjusted such that when the seatback 16 is tilted rearward by a predetermined angle (for example, 30°) or greater with respect to the vertical direction, the mover device 50 moves the shoulder anchor 36 to the moved position D2 (see FIG. 3) at the top-to-bottom direction lower side of the seatback 16.

Accordingly, in a state in which when the seatback 16 is tilted heavily rearward with respect to the vertical direction, the shoulder belt 22A passing through the shoulder anchor 36 moves together with the shoulder anchor 36 toward the top-to-bottom direction lower side of the seatback 16, such that the occupant P is restrained by the shoulder belt 22A. Accordingly, the possibility of poor performance during initial restraint of the occupant P by the shoulder belt 22A in a frontal collision, and the possibility of the occupant P slipping out from the shoulder belt 22A in a rear collision, can be reduced.

In the vehicle occupant restraint device 10 described above, the mover device 50 moves the shoulder anchor 36 toward the top-to-bottom direction lower side of the seatback 16 coupled to rearward tilting of the seatback 16. This thereby enables the occupant P to be restrained appropriately according to the angle of rearward tilting of the seatback 16 with respect to the vertical direction.

In the vehicle occupant restraint device 10 described above, the mover device 50 includes the push-pull wire 56 that couples the shoulder anchor 36 to the seat cushion frame 60 of the seat cushion 14 through the operation frame 102 and the slider 82. Accordingly, the slider 82 is pulled by the inner wire 56B of the push-pull wire 56 through the operation frame 102 coupled to rearward tilting of the seatback 16, thus moving the shoulder anchor 36 to the moved position D2 at the top-to-bottom direction lower side of the seatback 16. This thereby enables the occupant P to be restrained appropriately according to the angle of rearward tilting of the seatback 16 with respect to the vertical direction using a simple configuration.

Figure 16A:
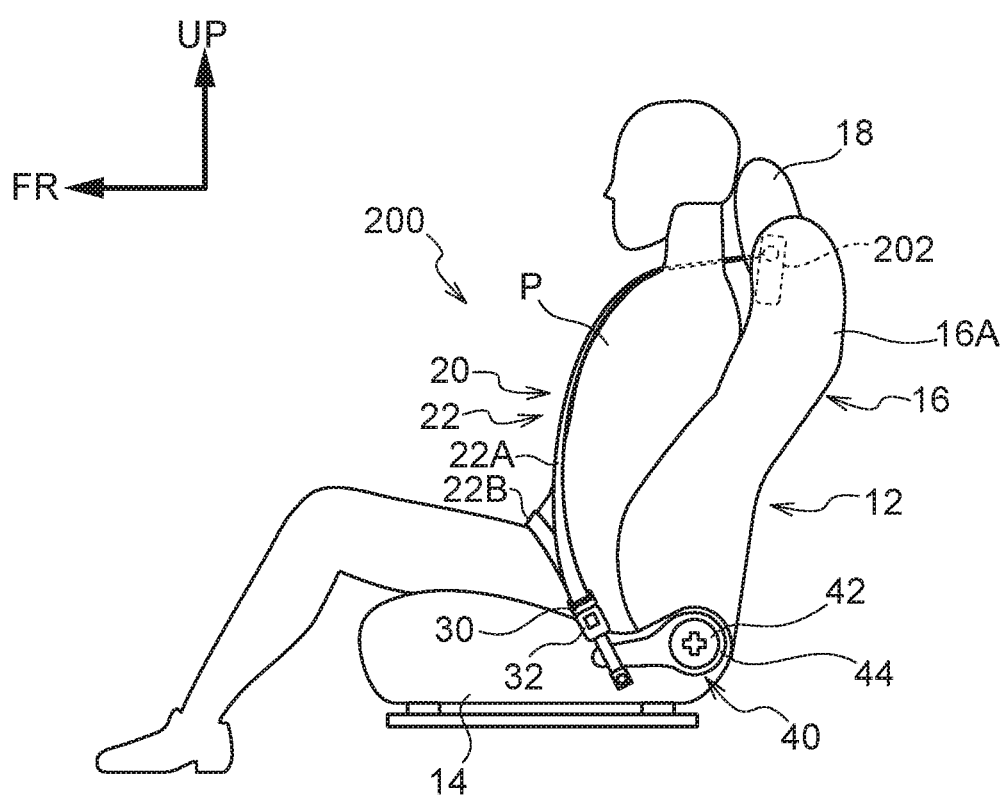
FIG. 16A is a side view illustrating a state in which an occupant sitting in a vehicle seat with a seatback in an upright state is being restrained by a vehicle occupant restraint device of a comparative example.
Figure 16B:
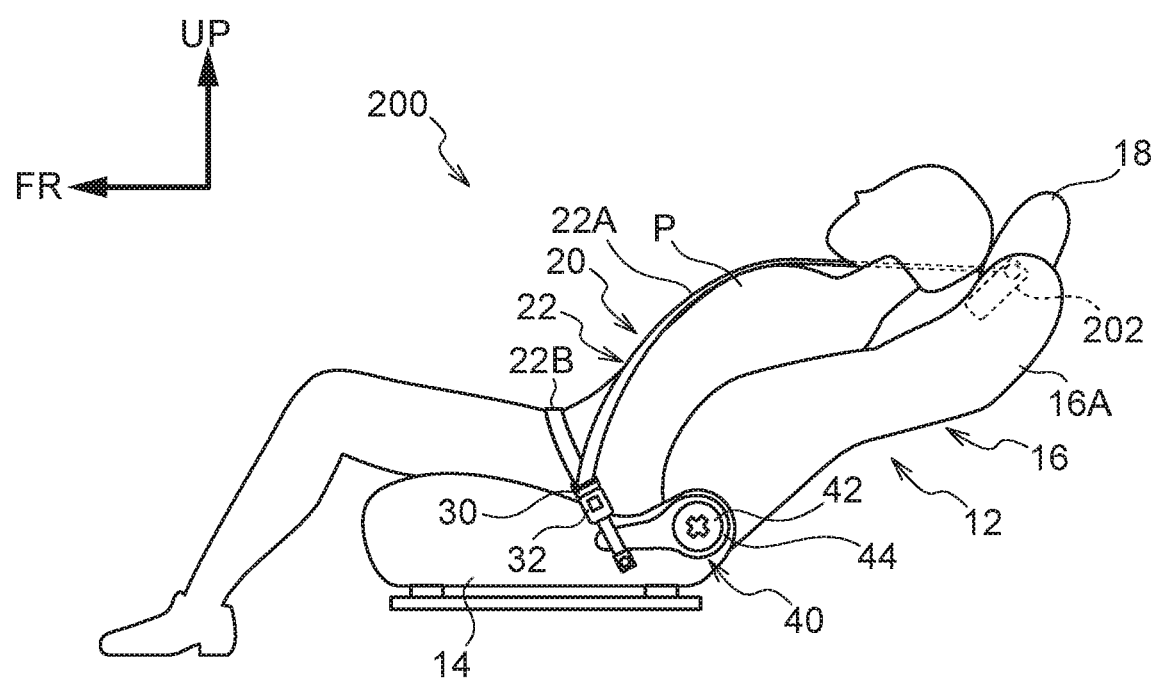
FIG. 16B is a side view illustrating a state in which an occupant sitting in a vehicle seat with a seatback in a rearward tilted state is being restrained by a vehicle occupant restraint device of the comparative example.

FIG. 16A and FIG. 16B are side views illustrating a vehicle occupant restraint device 200 according to a comparative example. As illustrated in FIG. 16A and FIG. 16B, in the vehicle occupant restraint device 200, the upper portion 16A of the seatback 16 is provided with a shoulder anchor 202 configuring a shoulder belt anchor through which the shoulder belt 22A is passed. The vehicle occupant restraint device 200 is not provided with a mover device to move the shoulder anchor 202 toward the top-to-bottom direction lower side of the seatback 16. Namely, as illustrated in FIG. 16B, in the vehicle occupant restraint device 200, the shoulder anchor 202 does not move, even when the seatback 16 is tilted rearward by a predetermined angle (for example 30°) or greater with respect to the vertical direction.

In the vehicle occupant restraint device 200 described above, since the upper body of the occupant P sitting in the seat 12 is offset with respect to the center of rotation of the seatback 16, if the seatback 16 is tilted heavily rearward, the shoulder anchor 202 moves toward the upper side of the seatback 16 relative to the occupant P sitting in the seat 12. Accordingly, in a state in which the seatback 16 has been tilted heavily rearward, there is a possibility of poor performance of the shoulder belt 22A during initial restraint of the occupant P in a frontal collision and a possibility of causing the occupant P to slip out from the shoulder belt 22A in a rear collision.

By contrast, in the vehicle occupant restraint device 10 of the first exemplary embodiment, the mover device 50 moves the shoulder anchor 36 to the moved position D2 toward the top-to-bottom direction lower side of the seatback 16 coupled to rearward tilting of the seatback 16. Accordingly, since the shoulder belt 22A moves toward the top-to-bottom direction lower side of the seatback 16 together with the shoulder anchor 36, the possibility of poor performance during initial restraint of the occupant P by the shoulder belt 22A in a frontal collision, and the possibility of the occupant P slipping out from the shoulder belt 22A in a rear collision, can be reduced.

Second Exemplary Embodiment

Figure 13:
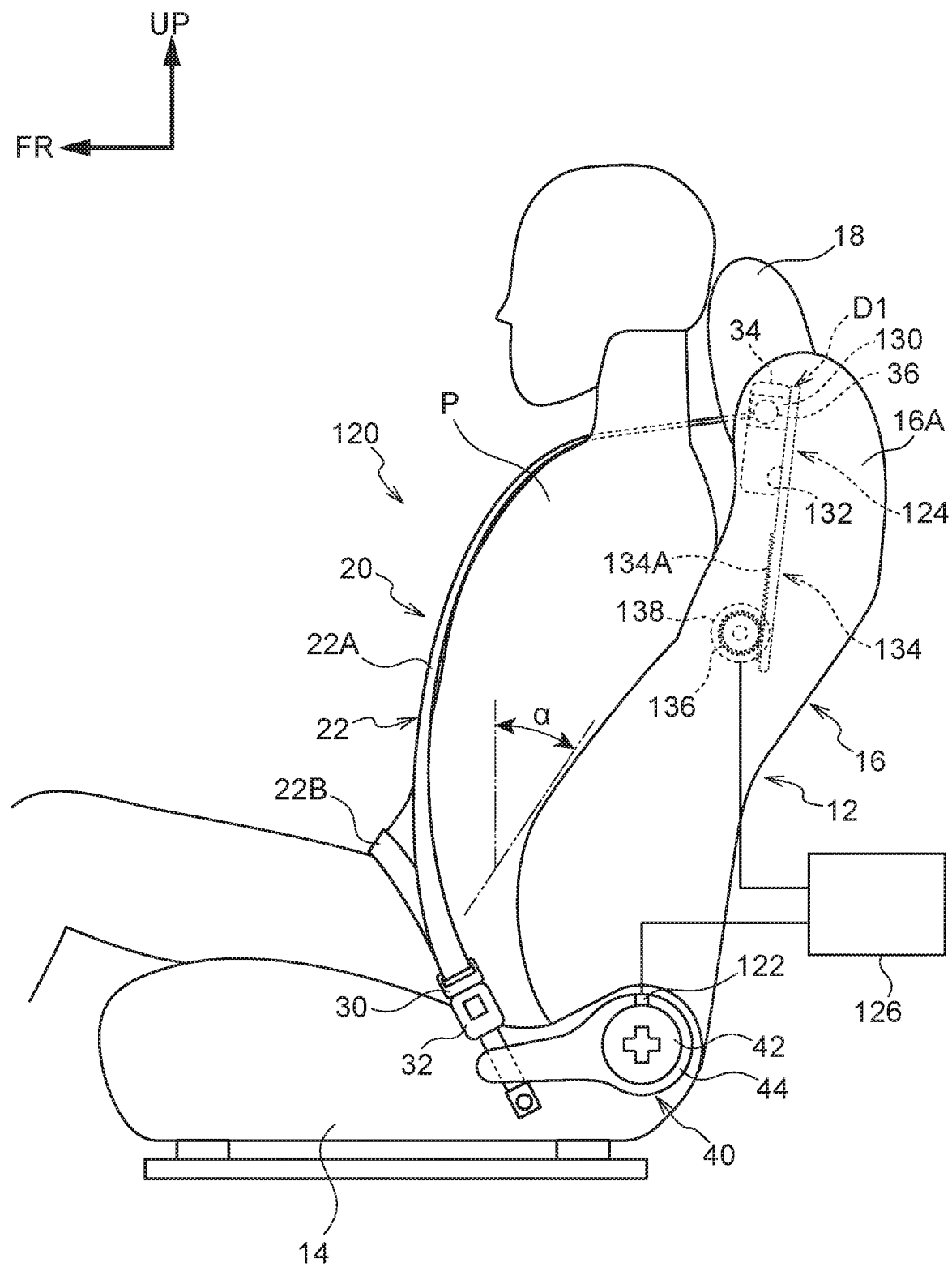
FIG. 13 is a side view illustrating a state in which an occupant sitting in a vehicle seat with a seatback in an upright state is being restrained by a vehicle occupant restraint device according to a second exemplary embodiment.
Figure 14:
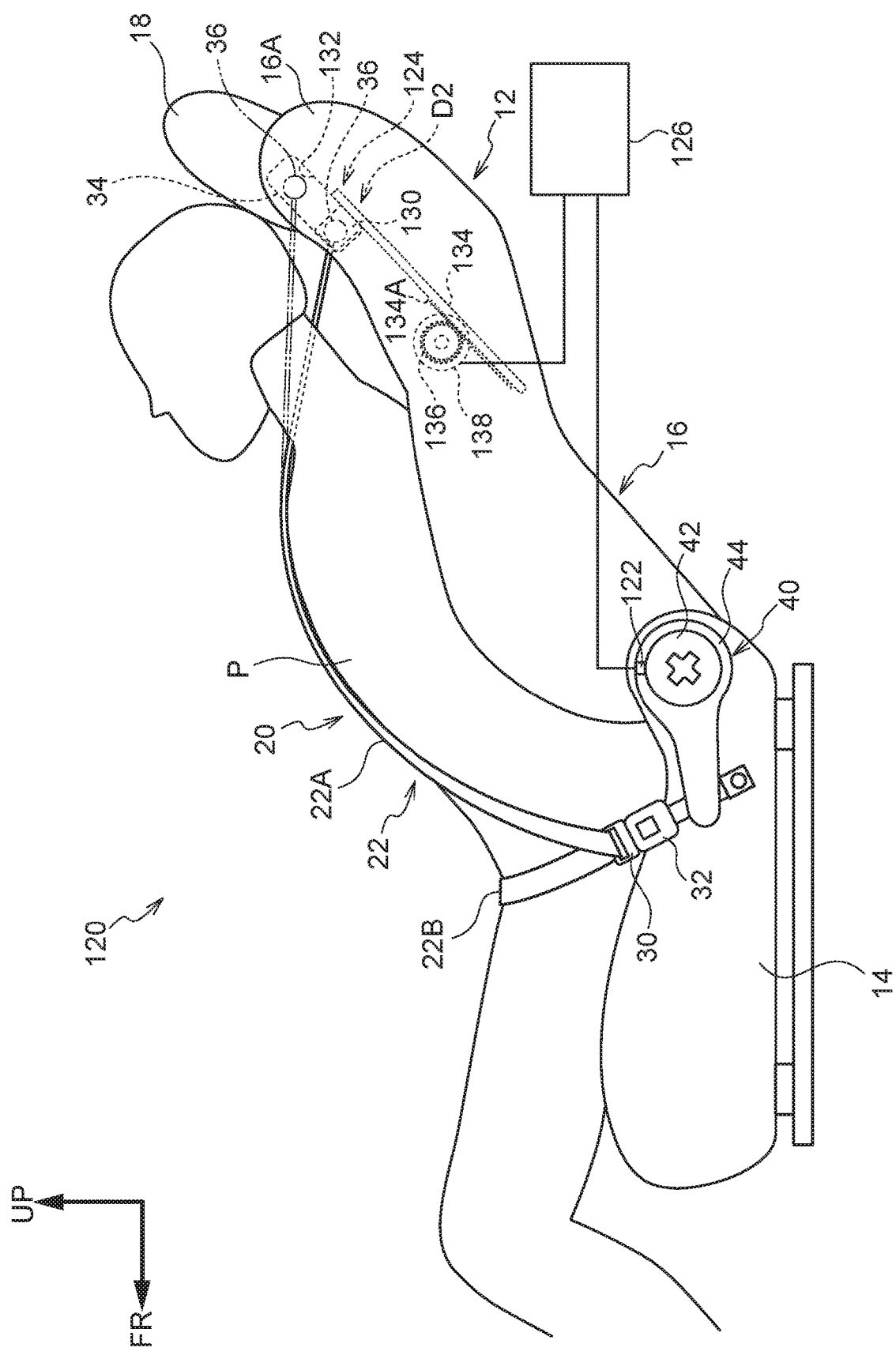
FIG. 14 is a side view illustrating a state in which an occupant sitting in a vehicle seat with a seatback in a rearward tilted state is being restrained by a vehicle occupant restraint device according to the second exemplary embodiment.

Explanation follows regarding a vehicle occupant restraint device 120 of a second exemplary embodiment, with reference to FIG. 13 and FIG. 14. Note that configuration sections similar to those in the first exemplary embodiment described above are allocated the same reference numerals, and explanation thereof is omitted.

As illustrated in FIG. 13 and FIG. 14, the vehicle occupant restraint device 120 includes a sensor 122, a mover device 124, and a controller 126. The sensor 122 detects an angle $\alpha$ of the seatback 16 with respect to the vertical direction. The mover device 124 moves the shoulder anchor 36 substantially in the top-to-bottom direction of the seatback 16, and the controller 126 controls operation of the mover device 124 based on the angle of rearward tilting detected by the sensor 122. The mover device 124 is an example of an electrical adjustment device. The sensor 122 is provided at a position opposing the rotation section 42 of the guide section 44. The controller 126 is, for example disposed within an instrument panel (not illustrated in the drawings) located at the front of the vehicle cabin. The controller 126 is electrically connected to the sensor 122, and angle detection signals from the sensor 122 are input to the controller 126.

The mover device 124 includes a support section 130 and a guide section 132. The support section 130 supports the shoulder anchor 36, and the guide section 132 guides top-to-bottom direction movement of the support section 130. The mover device 124 includes a shaft 134, a pinion 136, and a motor 138. The shaft 134 is attached to the support section 130 and is provided with a rack 134A. The pinion 136 meshes with the rack 134A, and the motor 138 rotates the pinion 136. The controller 126 is electrically connected to the motor 138, and uses the motor 138 to rotate the pinion 136 so as to move the shaft 134 provided with the rack 134A substantially in the top-to-bottom direction of the seatback 16, thereby moving the shoulder anchor 36 substantially in the top-to-bottom direction of the seatback 16.

As illustrated in FIG. 14, when the sensor 122 has detected that the angle $\alpha$ of the seatback 16 with respect to the vertical direction has reached the predetermined angle (for example 30°) or greater, the controller 126 actuates the mover device 124 so as to move the shoulder anchor 36 to the moved position D2 toward the top-to-bottom direction lower side of the seatback 16.

In the vehicle occupant restraint device 120 described above, the following advantageous effects are obtained in addition to the advantageous effects described in the first exemplary embodiment. In the vehicle occupant restraint device 120, after the seatback 16 has tilted rearward by the predetermined angle (for example 30°) with respect to the vertical direction, namely when the seatback 16 has tilted rearward by the predetermined angle (for example 30°) with respect to the vertical direction, the electrical mover device 124 moves the shoulder anchor 36 toward the vehicle vertical direction lower side. In the second exemplary embodiment, employing the electrical mover device 124 enables, for example, a reduction in costs in comparison to cases in which the shoulder belt anchor is moved coupled to rearward tilting of the seatback by a mechanical configuration.

Note that in the second exemplary embodiment, configuration may be made in which the shoulder anchor 36 is moved from the normal position D1 to the moved position D2 by the electrical mover device 124 coupled to rearward tilting of the seatback 16. Moreover, in the second exemplary embodiment, configuration may be made in which the shoulder anchor 36 is moved toward the vehicle vertical direction lower side gradually or incrementally by the electrical mover device 124 coupled to rearward tilting of the seatback 16.

Third Exemplary Embodiment

Figure 15:
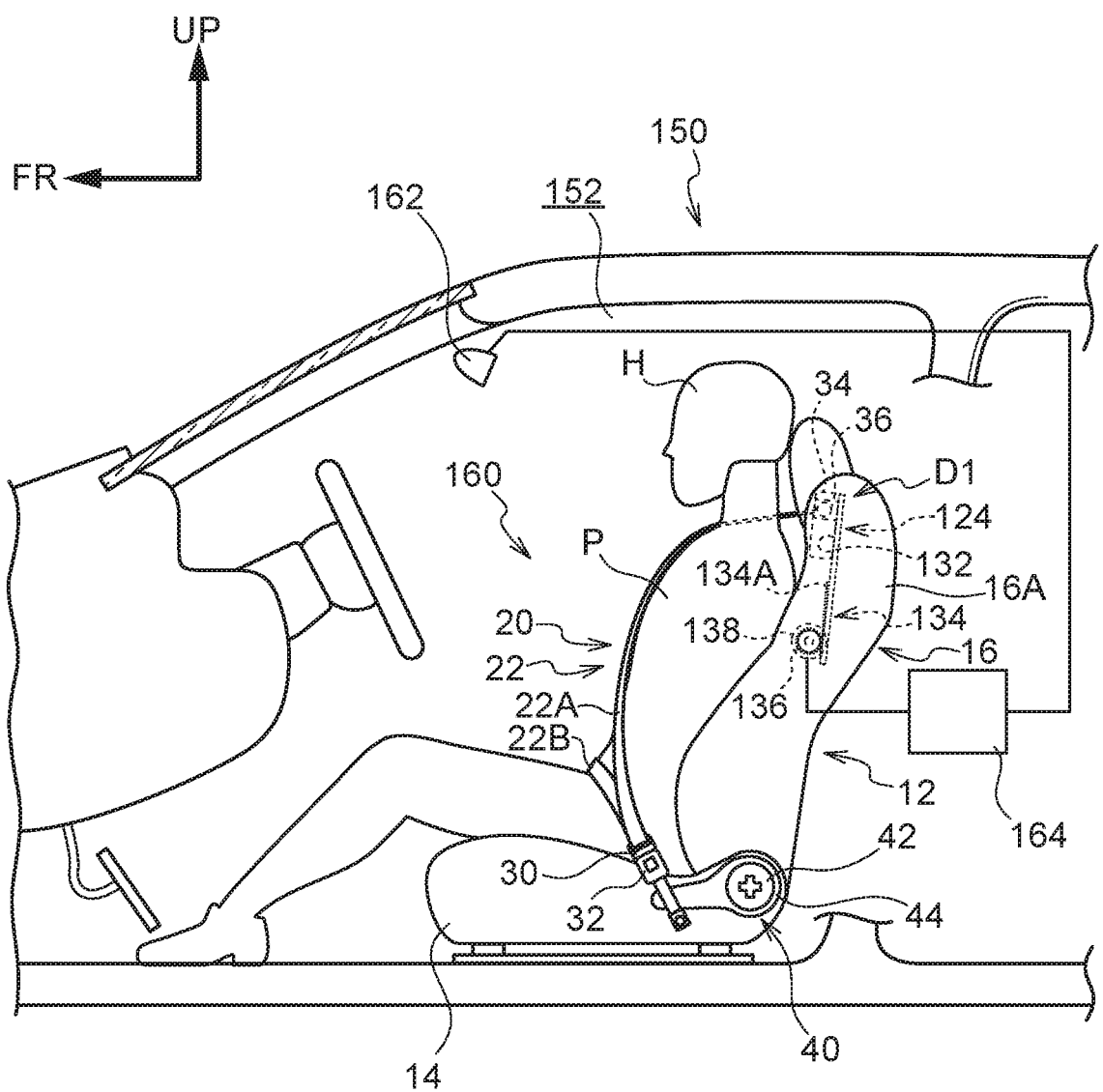
FIG. 15 is a side view illustrating the interior of a vehicle cabin of a vehicle applied with a vehicle occupant restraint device according to a third exemplary embodiment, in a state in which an occupant sitting in a vehicle seat with a seatback in an upright state is being restrained.

Explanation follows regarding a vehicle occupant restraint device 160 of a third exemplary embodiment, with reference to FIG. 15. Note that configuration sections similar to those in the first and second exemplary embodiments described above are allocated the same reference numerals, and explanation thereof is omitted.

As illustrated in FIG. 15, the vehicle occupant restraint device 160 includes a camera 162 that is disposed at the vehicle front-rear direction front of the interior of a vehicle cabin 152 of a vehicle 150, and that images the head H of the occupant P sitting in the seat 12. The vehicle occupant restraint device 160 includes a mover device 124 and a controller 164. The mover device 124 moves the shoulder anchor 36 substantially in the top-to-bottom direction of the seatback 16, and the controller 164 controls operation of the mover device 124 based on the position of the head H of the occupant P imaged by the camera 162. The camera 162 and the controller 164 are electrically connected to each other, and data representing the head H of the occupant P imaged by the camera 162 is input to the controller 164.

The controller 164 is, for example, pre-stored with a position of the head H of the occupant P sitting in the seat 12 when an angle α of the seatback 16 is at a predetermined angle (for example 30°) or greater with respect to the vertical direction. Although not illustrated in the drawings, in the vehicle occupant restraint device 160, the head H of the occupant P sitting in the seat 12 is imaged by the camera 162 when the seatback 16 has been tilted rearward. The controller 164 controls operation of the mover device 124 according to the position of the head H of the occupant P imaged by the camera 162 so as to move the shoulder anchor 36 to the moved position D2 (not illustrated in the drawings) toward substantially the top-to-bottom direction lower side of the seatback 16. In the third exemplary embodiment, when the position of the head H of the occupant P imaged by the camera 162 corresponds to a position of the head H of the occupant P when the angle α of the seatback 16 with respect to the vertical direction is the predetermined angle (for example 30°) or greater, the operation of the mover device 124 is controlled to move the shoulder anchor 36 to the moved position D2 (not illustrated in the drawings).

In the vehicle occupant restraint device 160 described above, the following advantageous effects are obtained in addition to the advantageous effects described in the first exemplary embodiment and the second exemplary embodiment. In the vehicle occupant restraint device 160, the shoulder anchor 36 is moved toward the vehicle vertical direction lower side by the mover device 124 according to the position of the head H of the occupant P imaged by the camera 162. Namely, the shoulder anchor 36 is moved toward the vehicle vertical direction lower side by the mover device 124 coupled to rearward tilting of the seatback 16 according to the position of the head H of the occupant P. This thereby enables the occupant P to be restrained appropriately according to the position of the head H of the occupant P sitting in the seat 12.

Note that in the third exemplary embodiment, configuration may be made in which the shoulder anchor 36 is moved from the normal position D1 to the moved position D2 (not illustrated in the drawings) by the mover device 124 when the position of the head H of the occupant P sitting in the seat 12 has reached the predetermined angle (for example 30°) with respect to the vertical direction. Alternatively, in the third exemplary embodiment, configuration may be made in which the shoulder anchor 36 is moved toward the vehicle vertical direction lower side gradually or incrementally by the mover device 124 coupled to rearward tilting of the seatback 16, according to the position of the head H of the occupant P.

Supplementary Explanation

In the first exemplary embodiment to the third exemplary embodiment, the configuration of the mover device 50, 124 that moves the shoulder anchor 36 substantially in the top-to-bottom direction of the seatback 16 may be modified. For example, the mover device 124 may be configured so as to move the shoulder anchor 36 substantially toward the top-to-bottom direction lower side of the seatback 16 using an actuator, a drive section such as a hydraulic cylinder, or a link mechanism.

In the first exemplary embodiment to the third exemplary embodiment, the present disclosure is applied to the vehicle occupant restraint device 10, 120, 160 of the seat 12 on the driver's seat side of the vehicle. However, the present disclosure is not limited thereto. For example, a vehicle occupant restraint device of the present disclosure may be applied to a vehicle seat other than a driver's seat, such as a front passenger seat.

Detailed explanation has been given regarding specific exemplary embodiments of the present disclosure. However, the present disclosure is not limited to these exemplary embodiments, and it would be clear to a practitioner skilled in the art that various other embodiments are possible within the scope of the present disclosure.

The disclosure of Japanese Patent Application No. 2018-018545, filed on Feb. 5, 2018, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A vehicle occupant restraint device comprising:
   a three-point seatbelt device comprising a shoulder belt extending from an upper portion on one seat width direction side of a seatback of a vehicle seat on which an occupant sits, toward a buckle at a lower portion on another seat width direction side;

a shoulder belt anchor for the shoulder belt to pass through at a shoulder opening on the one seat width direction side of an upper section of the seatback; and a mover device that moves the shoulder belt anchor toward a lower side of the seatback in a top-to-bottom direction when the seatback, which is configured to tilt rearward from an upright state, has been tilted rearward by a predetermined angle or greater with respect to a vertical direction, wherein the mover device moves the shoulder belt anchor toward the lower side coupled to rearward tilting of the seatback, the mover device comprises a push-pull wire coupling the shoulder belt anchor to part of a seat cushion at the vehicle seat, the push-pull wire connects the shoulder belt anchor and a seat cushion frame of the seat cushion, a lower portion of the push-pull wire is connected
  inside the seat cushion to the seat cushion frame and on the one seat width direction side, and the push-pull wire extends
  inside the seat back and
  substantially vertically when viewed toward a front side of the seat back.

2. The vehicle occupant restraint device of claim 1, wherein the push-pull wire comprises an outer tube that is within the seatback and an inner wire that is capable of moving within the outer tube and that that moves the shoulder belt anchor toward the top-to-bottom direction lower side of the seatback.

3. The vehicle occupant restraint device of claim 2, wherein:

when the seat back is in a normal driving posture, a predetermined gap is present between a terminal portion of the push-pull wire and the seat cushion frame;

the terminal portion is on one end of the inner wire and is capable of hooking onto the seat cushion frame within the seat cushion; and another terminal portion on another end of the inner wire has been joined to an operation portion and the operation portion is configured to move the shoulder anchor toward the top-to-bottom direction lower side.

4. The vehicle occupant restraint device according to claim 1, further comprising:

a guide plate on an upper side of a guide section in a vehicle vertical direction and at an interval from the guide section, and the push-pull wire extends toward an upper side of the seat cushion frame and is between the guide plate and the guide section.

5. The vehicle occupant restraint device according to claim 1, wherein:

an upper end portion of the push-pull wire is connected to an operation portion, the operation portion being configured to move in the top-to-bottom direction within a predetermined range.

* * * * *